(12) United States Patent
Wu

(10) Patent No.: US 12,238,063 B2
(45) Date of Patent: Feb. 25, 2025

(54) BUSINESS SERVICE PROVIDING METHOD AND SYSTEM, AND REMOTE ACCELERATION GATEWAY

(71) Applicant: Huawei Cloud Computing Technologies Co., Ltd., Guizhou (CN)

(72) Inventor: Xiaomin Wu, Gui'an (CN)

(73) Assignee: Huawei Cloud Computing Technologies Co., Ltd., Gui'an New District (CN)

( * ) Notice: Subject to any disclaimer, the term of this patent is extended or adjusted under 35 U.S.C. 154(b) by 445 days.

(21) Appl. No.: 17/718,473

(22) Filed: Apr. 12, 2022

(65) Prior Publication Data

US 2022/0239629 A1 Jul. 28, 2022

Related U.S. Application Data

(63) Continuation of application No. PCT/CN2020/121034, filed on Oct. 15, 2020.

(30) Foreign Application Priority Data

Oct. 15, 2019 (CN) .......................... 201910979758.7

(51) Int. Cl.
*H04L 61/2514* (2022.01)
*G06F 9/455* (2018.01)
*H04L 12/66* (2006.01)

(52) U.S. Cl.
CPC ...... *H04L 61/2514* (2013.01); *G06F 9/45558* (2013.01); *H04L 12/66* (2013.01); *G06F 2009/45595* (2013.01); *H04L 2212/00* (2013.01)

(58) Field of Classification Search
CPC . H04L 61/2592; H04L 61/2514; H04L 12/66; H04L 45/74; H04L 12/4633; H04L 2212/00; G06F 9/45558; G06F 2009/45595
See application file for complete search history.

(56) References Cited

U.S. PATENT DOCUMENTS

| 10,397,189 | B1 * | 8/2019 | Hashmi | H04L 63/0272 |
| 11,411,771 | B1 * | 8/2022 | Dawani | H04L 12/4641 |
| 11,431,497 | B1 * | 8/2022 | Liguori | H04L 9/0897 |

(Continued)

FOREIGN PATENT DOCUMENTS

| CN | 104468306 A | 3/2015 |
| CN | 104601432 A | 5/2015 |

(Continued)

*Primary Examiner* — Brian D Nguyen
(74) *Attorney, Agent, or Firm* — Maier & Maier, PLLC

(57) ABSTRACT

A border gateway receives a first overlay packet sent by a remote acceleration gateway, where a first service request packet is encapsulated in the first overlay packet, a source Internet Protocol (IP) address of the first service request packet is an IP address of a client, and a destination IP address is a public IP address associated with a virtual machine; the border gateway decapsulates the first overlay packet to obtain the first service request packet, encapsulates the first service request packet to generate a second overlay packet, and sends the second overlay packet to a virtual forwarding device, implementing transparent transmission of a source address of a service request packet.

12 Claims, 14 Drawing Sheets

(56) References Cited

U.S. PATENT DOCUMENTS

| | | | | |
|---|---|---|---|---|
| 2011/0317703 A1* | 12/2011 | Dunbar | ............... | H04L 61/2596 |
| | | | | 370/392 |
| 2014/0146817 A1 | 5/2014 | Zhang | | |
| 2015/0188949 A1* | 7/2015 | Mahaffey | ............ | H04L 41/0894 |
| | | | | 726/1 |
| 2016/0087940 A1 | 3/2016 | Miller et al. | | |
| 2017/0346686 A1* | 11/2017 | Mudigonda | ......... | H04L 61/5084 |
| 2018/0316769 A1 | 11/2018 | Akers et al. | | |

FOREIGN PATENT DOCUMENTS

| | | | |
|---|---|---|---|
| CN | 104639470 | A | 5/2015 |
| CN | 105227498 | A | 1/2016 |
| CN | 106899500 | A | 6/2017 |
| CN | 108768817 | A | 11/2018 |
| WO | 2021073565 | A1 | 4/2021 |

* cited by examiner

| Version number field | Option length field | Operation administration and maintenance frame field | Critical option flag field | Reserved field 4 | Protocol type field |
|---|---|---|---|---|---|
| | VNI field | | | | Reserved field 5 |
| Variable length option field | | | | | |

FIG. 8

| Option class field | Type field | Reserved field 6 | Reserved field 6 | Reserved field 6 | Length field |
|---|---|---|---|---|---|
| Variable option data field | | | | | |

FIG. 9

BUSINESS SERVICE PROVIDING METHOD AND SYSTEM, AND REMOTE ACCELERATION GATEWAY

CROSS-REFERENCE TO RELATED APPLICATIONS

This application is a continuation of International Application No. PCT/CN2020/121034, filed on Oct. 15, 2020, which claims priority to Chinese Patent Application No. 201910979758.7, filed on Oct. 15, 2019. the disclosure of which is hereby incorporated by reference in its entirety.

TECHNICAL FIELD

The embodiments relate to the field of communications technologies, and in particular, to a business service providing method and system, and a remote acceleration gateway.

BACKGROUND

With rapid development of cloud computing technologies, more users use cloud services. A user may access a cloud service provider by using a client, to request the cloud service provider to provide a cloud service for the client, and the cloud service provider may provide a cloud service for the client according to a request of the client.

In a related technology, a process in which the client requests the cloud service provider to provide a cloud service is as follows: The client sends a service request packet to a remote acceleration gateway. After receiving the service request packet, the remote acceleration gateway first performs full network address translation (FullNAT) on the service request packet, that is, performs address translation on both a source address and a destination address of the service request packet, and then sends a service request packet obtained after the address translation to the cloud service provider through a global backbone network, to request, by using the service request packet, the cloud service provider to provide the cloud service for the client. A process in which the cloud service provider provides the client with the cloud service requested by using the service request packet is as follows: The cloud service provider sends a service response packet for the service request packet to the remote acceleration gateway through the global backbone network. After receiving the service response packet, the remote acceleration gateway first performs full network address translation on the service response packet, and then sends a service response packet obtained after the address translation to the client, so that the client uses the cloud service requested by the service request packet.

However, in the process in which the client requests the cloud service provider to provide the cloud service, the remote acceleration gateway performs translation on the source address of the service request packet. Consequently, it is difficult for the cloud service provider to learn of the source address of the service request packet.

SUMMARY

The embodiments include a business service providing method and system, and a remote acceleration gateway may resolve a current problem that it is difficult for the cloud service provider to learn of a source address of a service request packet.

According to a first aspect, a business service providing method is provided. The business service providing method is applied to a business service providing system, and the business service providing system includes a border gateway, a virtual forwarding device, and a virtual machine. The virtual machine is configured to provide a business service for a client. The method includes: the border gateway receives a first overlay packet sent by a remote acceleration gateway, where a first service request packet is encapsulated in the first overlay packet, a source Internet Protocol (IP) address of the first service request packet is an IP address of the client, and a destination IP address is a public IP address associated with the virtual machine; the border gateway decapsulates the first overlay packet to obtain the first service request packet, encapsulates the first service request packet to generate a second overlay packet, and sends the second overlay packet to the virtual forwarding device; and the virtual forwarding device decapsulates the second overlay packet to obtain the first service request packet, and sends the first service request packet to the virtual machine.

In the business service providing method provided in this embodiment, in a process in which a service request packet is sent to the virtual machine, address translation is not performed on a source IP address of the service request packet, and the source IP address of the service request packet sent to the virtual machine is still the IP address of the client. In this way, the virtual machine can learn of the source IP address of the service request packet received by the virtual machine, and transparent transmission of the source address of the service request packet is implemented. This helps the virtual machine implement functions such as statistics and analysis functions based on the source IP address.

The virtual machine may alternatively be another system or device such as a container that can provide a business service.

In an implementation, the virtual forwarding device is a virtual switch, and the public IP address associated with the virtual machine is a public IP address bound to the virtual machine.

In another implementation, the virtual forwarding device is a load balancer, the load balancer provides a load balancing service for the virtual machine, and the public IP address associated with the virtual machine is a public IP address bound to the load balancer.

In still another implementation, the virtual forwarding device is an IPv6 gateway, and the public IP address associated with the virtual machine is a public IPv6 address of the virtual machine.

In yet another implementation, the virtual forwarding device is a VPN gateway, and the public IP address associated with the virtual machine is a public IP address bound to the VPN gateway.

In still yet another implementation, when the virtual forwarding device is a NAT gateway, the public IP address associated with the virtual machine is a public IP address bound to the NAT gateway.

Optionally, the first overlay packet carries an IP address of the remote acceleration gateway. A process in which the border gateway decapsulates the first overlay packet to obtain the first service request packet and encapsulates the first service request packet to generate a second overlay packet further includes: the border gateway obtains the IP address of the remote acceleration gateway carried in the first overlay packet and sets the second overlay packet to carry the IP address of the remote acceleration gateway.

Correspondingly, that the virtual forwarding device decapsulates the second overlay packet to obtain the first service request packet further includes: the virtual forwarding device obtains the IP address of the remote acceleration gateway carried in the second overlay packet; the virtual forwarding device obtains the source IP address of the first service request packet, where the source IP address of the first service request packet is the IP address of the client; and the virtual forwarding device records a correspondence between the IP address of the remote acceleration gateway and the IP address of the client.

The correspondence between the IP address of the client and the IP address of the remote acceleration gateway carried in the second overlay packet is recorded, so that during retrieval, the remote acceleration gateway configured to send a service response packet to the client can be determined by querying the correspondence, so as to ensure a retrieval process.

It should be noted that the correspondence may alternatively be a correspondence between the IP address of the client and a 2-tuple, a 3-tuple, a 4-tuple, or a 5-tuple including the source IP address of the first service request packet.

In addition, the correspondence may alternatively be a correspondence between the IP address of the client, a network identifier, and a 2-tuple, a 3-tuple, a 4-tuple, or a 5-tuple including the source IP address of the first service request packet. The network identifier is a network identifier of an overlay network used to transmit an overlay packet in which the first service request packet is encapsulated.

When an overlay network is used to transmit the overlay packet in which the first service request packet is encapsulated, the overlay network that needs to be used needs to be determined based on the network identifier, and the overlay packet is transmitted through the overlay network indicated by the network identifier. In addition, in a related technology, the network identifier needs to be manually set. Therefore, in this embodiment, address learning is performed based on the network identifier of the overlay network used to transmit the first service request packet, and the correspondence can be established based on the address learning. In this way, the network identifier of the overlay network configured to send the overlay packet whose destination IP address is the source IP address of the first service request packet can be automatically determined. That is, automatic configuration of the network identifier is implemented, and manual intervention in a process of configuring the network identifier can be reduced. This improves sending efficiency and accuracy of the overlay packet.

In a possible implementation, after the virtual forwarding device sends the first service request packet to the virtual machine, the method further includes: the virtual forwarding device receives a first service response packet sent by the virtual machine based on the first service request packet, where a destination IP address of the first service response packet is the IP address of the client; the virtual forwarding device obtains the IP address of the remote acceleration gateway from the correspondence based on the destination IP address of the first service response packet; the virtual forwarding device encapsulates the first service response packet to generate a third overlay packet, where the third overlay packet carries the IP address of the remote acceleration gateway, and the virtual forwarding device sends the third overlay packet to the border gateway; and the border gateway obtains the IP address of the remote acceleration gateway carried in the third overlay packet, decapsulates the third overlay packet to obtain the first service response packet, encapsulates the first service response packet to generate a fourth overlay packet, and sends the fourth overlay packet to the remote acceleration gateway based on the IP address of the remote acceleration gateway.

The process is a downlink process in which the virtual machine sends a service response packet based on a service request packet until the service response packet is sent to the client. In the downlink process, the virtual forwarding device queries the correspondence between the IP address of the remote acceleration gateway and the IP address of the client, to obtain a tunnel endpoint IP address of the remote acceleration gateway, and uses the third overlay packet sent by the virtual forwarding device to the border gateway to carry the tunnel endpoint IP address of the remote acceleration gateway, so that the border gateway can send the fourth overlay packet to the remote acceleration gateway based on the tunnel endpoint IP address of the remote acceleration gateway. In this way, the remote acceleration gateway sends the first service response packet for the first service request packet to the client, to implement retrieval of the first service response packet.

According to a second aspect, a business service providing method is provided. The business service providing method is applied to a remote acceleration gateway, and the method includes: the remote acceleration gateway receives a second service request packet sent by a client, where a source IP address of the second service request packet is an IP address of the client, and a destination IP address is an IP address of the remote acceleration gateway; the remote acceleration gateway performs destination address translation on the second service request packet to generate a first service request packet, where a source IP address of the first service request packet is the IP address of the client, a destination IP address is a public IP address associated with a virtual machine, and the virtual machine is configured to provide a business service for the client; the remote acceleration gateway encapsulates the first service request packet to generate a first overlay packet, where the first overlay packet carries the IP address of the remote acceleration gateway; and the remote acceleration gateway sends the first overlay packet to a border gateway on which the virtual machine is located.

Optionally, the method further includes: the remote acceleration gateway receives a fourth overlay packet sent by the border gateway, where a first service response packet is encapsulated in the fourth overlay packet, a source IP address of the first service response packet is the public IP address associated with the virtual machine, and a destination IP address is the IP address of the client; the remote acceleration gateway decapsulates the fourth overlay packet to obtain the first service response packet; the remote acceleration gateway performs source IP address translation on the first service response packet to generate a second service response packet, where a source IP address of the second service response packet is the IP address of the remote acceleration gateway, and the destination IP address is the IP address of the client; and the remote acceleration gateway sends the second service response packet to the client.

According to a third aspect, a business service providing system is provided. The business service providing system includes a border gateway, a virtual forwarding device, and a virtual machine. The virtual machine is configured to provide a business service for a client. The border gateway is configured to receive a first overlay packet sent by a remote acceleration gateway, where a first service request packet is encapsulated in the first overlay packet, a source Internet Protocol (IP) address of the first service request packet is an IP address of the client, and a destination IP address is a public IP address associated with the virtual machine. The border gateway is configured to decapsulate the first overlay packet to obtain the first service request packet, encapsulate the first service request packet to generate a second overlay packet, and send the second overlay packet to the virtual forwarding device. The virtual forwarding device is configured to decapsulate the second overlay packet to obtain the first service request packet and send the first service request packet to the virtual machine.

The virtual machine may alternatively be another system or device such as a container that can provide a business service.

In an implementation, the virtual forwarding device is a virtual switch, and the public IP address associated with the virtual machine is a public IP address bound to the virtual machine.

In another implementation, the virtual forwarding device is a load balancer, the load balancer provides a load balancing service for the virtual machine, and the public IP address associated with the virtual machine is a public IP address bound to the load balancer.

In still another implementation, the virtual forwarding device is an IPv6 gateway, and the public IP address associated with the virtual machine is a public IPv6 address of the virtual machine.

In yet another implementation, the virtual forwarding device is a VPN gateway, and the public IP address associated with the virtual machine is a public IP address bound to the VPN gateway.

In still yet another implementation, when the virtual forwarding device is a NAT gateway, the public IP address associated with the virtual machine is a public IP address bound to the NAT gateway.

Optionally, the first overlay packet carries an IP address of the remote acceleration gateway. The border gateway is further configured to obtain the IP address of the remote acceleration gateway carried in the first overlay packet and set the second overlay packet to carry the IP address of the remote acceleration gateway. The virtual forwarding device is further configured to obtain the IP address of the remote acceleration gateway carried in the second overlay packet. The virtual forwarding device is further configured to obtain the source IP address of the first service request packet, where the source IP address of the first service request packet is the IP address of the client. The virtual forwarding device is further configured to record a correspondence between the IP address of the remote acceleration gateway and the IP address of the client.

Optionally, the virtual forwarding device is further configured to receive a first service response packet sent by the virtual machine based on the first service request packet, where a destination IP address of the first service response packet is the IP address of the client. The virtual forwarding device is further configured to obtain the IP address of the remote acceleration gateway from the correspondence based on the destination IP address of the first service response packet. The virtual forwarding device is further configured to encapsulate the first service response packet to generate a third overlay packet, where the third overlay packet carries the IP address of the remote acceleration gateway. The virtual forwarding device is further configured to send the third overlay packet to the border gateway. The border gateway is further configured to obtain the IP address of the remote acceleration gateway carried in the third overlay packet, decapsulate the third overlay packet to obtain the first service response packet, encapsulate the first service response packet to generate a fourth overlay packet, and send the fourth overlay packet to the remote acceleration gateway based on the IP address of the remote acceleration gateway.

According to a fourth aspect, a remote acceleration gateway is provided. The remote acceleration gateway is configured to receive a second service request packet sent by a client, where a source IP address of the second service request packet is an IP address of the client, and a destination IP address is an IP address of the remote acceleration gateway. The remote acceleration gateway is further configured to perform destination address translation on the second service request packet to generate a first service request packet, where a source IP address of the first service request packet is the IP address of the client, a destination IP address is a public IP address associated with a virtual machine, and the virtual machine is configured to provide a business service for the client. The remote acceleration gateway is further configured to encapsulate the first service request packet to generate a first overlay packet, where the first overlay packet carries the IP address of the remote acceleration gateway. The remote acceleration gateway is further configured to send the first overlay packet to a border gateway on which the virtual machine is located.

Optionally, the remote acceleration gateway is further configured to receive a fourth overlay packet sent by the border gateway, where a first service response packet is encapsulated in the fourth overlay packet, a source IP address of the first service response packet is the public IP address associated with the virtual machine, and a destination IP address is the IP address of the client. The remote acceleration gateway is further configured to decapsulate the fourth overlay packet to obtain the first service response packet. The remote acceleration gateway is further configured to perform source IP address translation on the first service response packet to generate a second service response packet, where a source IP address of the second service response packet is the IP address of the remote acceleration gateway, and the destination IP address is the IP address of the client. The remote acceleration gateway is further configured to send the second service response packet to the client.

According to a fifth aspect, a first computer device is provided. A border gateway may be deployed on the first computer device, and the first computer device includes a first processor and a first memory. The first memory stores a computer program, and when the first processor executes the computer program, the first computer device implements a function implemented by the border gateway in the business service providing method in the embodiments.

According to a sixth aspect, a second computer device is provided. A virtual forwarding device and a virtual machine may be deployed on the second computer device, and the second computer device includes a second processor and a second memory. The second memory stores a computer program, and when the second processor executes the computer program, the second computer device implements a function implemented by the virtual forwarding device in the business service providing method in the embodiments.

According to a seventh aspect, a third computer device is provided. A remote acceleration gateway may be deployed on the third computer device, and the third computer device includes a third processor and a third memory. The third memory stores a computer program, and when the third processor executes the computer program, the third computer device implements a function implemented by the remote acceleration gateway in the business service providing method in the embodiments.

According to an eighth aspect, a first storage medium is provided. When instructions in the first storage medium are executed by a processor, a function implemented by a border gateway in the business service providing method in the embodiments is implemented.

According to a ninth aspect, a second storage medium is provided. When instructions in the second storage medium are executed by a processor, a function implemented by a virtual forwarding device in the business service providing method in the embodiments is implemented.

According to a tenth aspect, a third storage medium is provided. When instructions in the third storage medium are executed by a processor, a function implemented by a remote acceleration gateway in the business service providing method in the embodiments is implemented.

According to an eleventh aspect, a first computer program product including instructions is provided. When the first computer program product is run on a computer, the computer is enabled to perform a function implemented by a border gateway in the business service providing method in the embodiments.

According to a twelfth aspect, a second computer program product including instructions is provided. When the second computer program product is run on a computer, the computer is enabled to perform a function implemented by a virtual forwarding device in the business service providing method in the embodiments.

According to a thirteenth aspect, a third computer program product including instructions is provided. When the third computer program product is run on a computer, the computer is enabled to perform a function implemented by a remote acceleration gateway in the business service providing method in the embodiments.

BRIEF DESCRIPTION OF DRAWINGS

FIG. 8 is a schematic diagram of a structure of still another VXLAN packet according to an embodiment;

FIG. 9 is a schematic diagram of a structure of a variable length option field according to an embodiment;

DETAILED DESCRIPTION OF THE EMBODIMENTS

Figure 1:
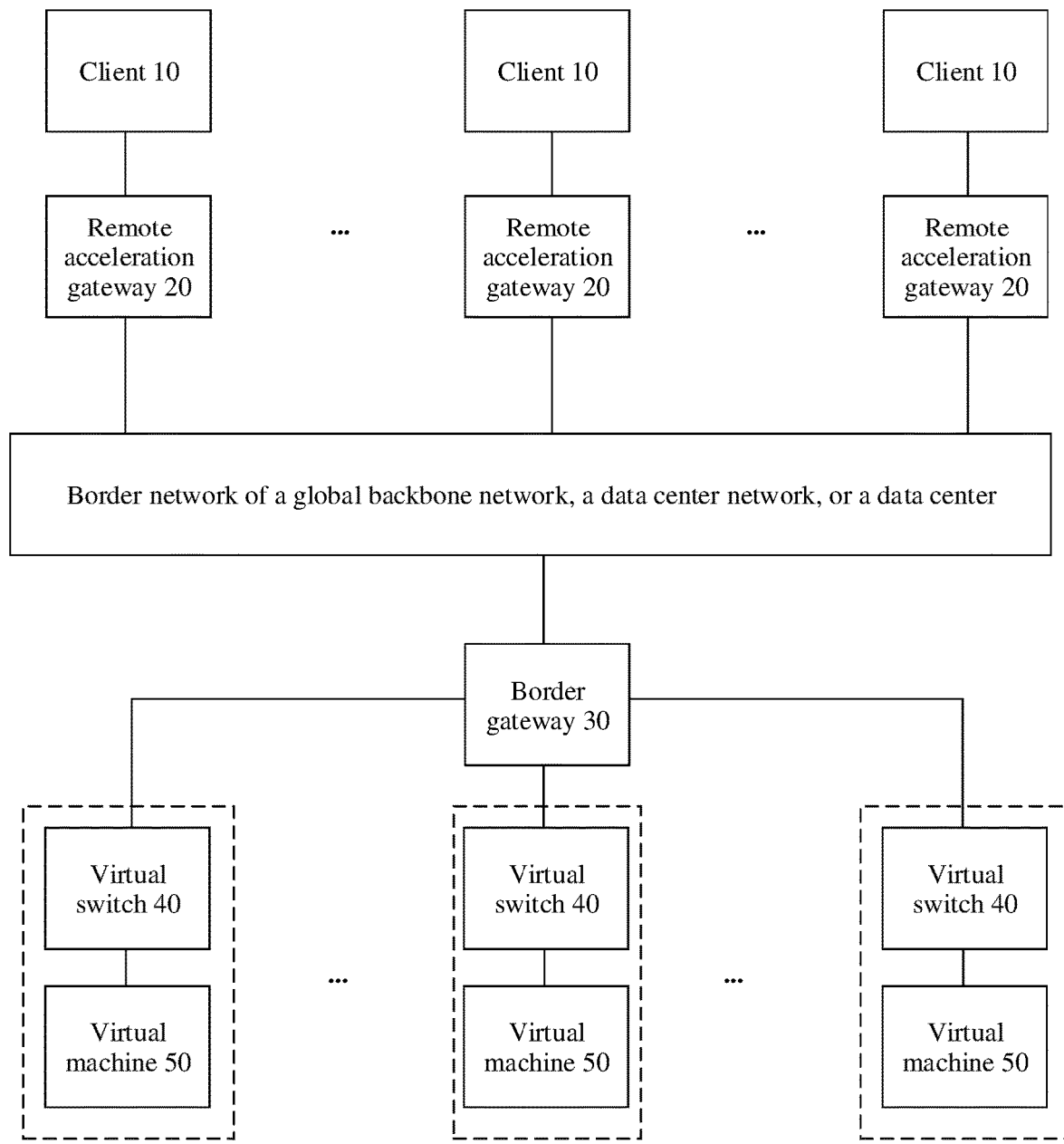
FIG. 1 is a schematic diagram of an application scenario related to a business service providing method according to an embodiment.

To make the objectives, solutions, and advantages clearer, the following further describes implementations in detail with reference to the accompanying drawings.

For ease of understanding, the following first explains terms in the embodiments.

An overlay network is a virtual network that runs over one or more existing networks and can provide a specific additional function. The overlay network encapsulates a to-be-transmitted packet to obtain an overlay packet and transmits the overlay packet through a tunnel of the overlay network. After the overlay packet is transmitted to a tunnel endpoint, the tunnel endpoint decapsulates the overlay packet, and sends the to-be-transmitted packet encapsulated at an inner layer of the overlay packet to an instance such as a virtual machine. This implements transmission of the to-be-transmitted packet.

A virtual extensible local area network (VXLAN) is an overlay network. The VXLAN encapsulates a to-be-transmitted packet in a User Datagram Protocol (UDP) packet, adds an Internet Protocol (IP) address and a media access control (MAC) address that are of a physical network to an outer layer of the UDP packet in which the to-be-transmitted packet is encapsulated, to obtain a VXLAN packet, and transmits the to-be-transmitted packet as payload data of the VXLAN packet in a layer-2 network and a layer-3 network. After the VXLAN packet arrives at a tunnel endpoint, the tunnel endpoint decapsulates the VXLAN packet to obtain the to-be-transmitted packet, and then sends the to-be-transmitted packet to an instance such as a virtual machine. The VXLAN encapsulates a layer-2 packet in the layer-3 network and provides a layer-2 interconnection method for distributed users. The VXLAN can isolate services for different tenants. With rapid development of virtualization technologies, a VXLAN technology is widely applied.

A backbone network is a high-speed network used to connect a plurality of regions or areas. Each backbone network has at least one connection point that interconnects with another backbone network. Different network providers usually have backbone networks to connect networks of the network providers in different regions. To better serve users, a cloud carrier usually sets up a global backbone network of the cloud carrier.

Point of presence (POP): In a computer network, the POP is located outside an edge of an enterprise network and is an entry point for accessing the enterprise network. Services provided by the outside access the enterprise network through the POP. These services include internet access, wide area network connection, and a telephone service. In the enterprise network, the POP provides links to an external service and an external site. The POP can directly connect to one or more internet service providers (ISPs), so that an internal user can access the internet through these links. Remote sites of the enterprise network are also connected through the POP, and wide area network links between these remote sites are set up by a service provider. For the ISP, the POP is an entry point that connects the internet from one place to another.

An acceleration gateway, also referred to as an accelerator, is deployed at a POP of a cloud carrier, so that an internet user can access a nearest backbone network of the cloud carrier and reach a backend service through the backbone network of the cloud carrier. In the embodiments, the acceleration gateway deployed at the POP may send a packet in an anycast transmission mode or a unicast transmission mode.

Anycast transmission: In the embodiments, acceleration gateways at different POPs of a cloud carrier advertise a same acceleration IP address on the internet in an anycast mode, so that internet users in different regions each can reach a nearest POP of the cloud carrier.

Unicast transmission is a transmission mode in which a separate data channel is established between a client and a server, so that each data packet sent from one server can be transmitted to only one client.

A network address translation (NAT) technology is a technology in which address translation is performed, by replacing address information in an IP packet header, on at least one of a destination IP address and a source IP address of a packet that needs to be sent. The NAT technology may include a destination network address translation (DNAT) technology, a source network address translation (SNAT) technology, and a full network address translation (fullNAT) technology. DNAT means address translation on a destination IP address of a packet. SNAT means address translation on a source IP address of a packet. FullNAT means address translation on both a destination IP address and a source IP address of a packet.

Border gateway: In a border zone of a region, the border gateway sends a corresponding public network packet to a corresponding instance gateway such as an elastic load balancer or a virtual switch bound to an EIP address.

An Elastic Internet Protocol (EIP) address is an IP address used by a computer device on a private network to access a public network.

An elastic load balancer (ELB) is a device that automatically distributes service access packets to a plurality of computer devices, to expand an external service capability, prevent performance deterioration or a node breakdown caused by heavy load on a single node, and eliminate a failure on a single node.

A virtual switch (vSwitch) runs on a virtualization platform, and provides layer-2 network access and some layer-3 network functions for a virtual machine (VM) in a software manner. The vSwitch is connected to an external network by using a physical NIC on a physical host as an uplink.

A virtual machine (VM) is a complete computer system simulated by using a virtualization technology, having a complete hardware system function, and running in an isolated environment. Some instruction subsets of the virtual machine may be processed in a host, and other instructions may be executed in a simulation manner. A user can purchase a cloud service by renting a virtual machine. In a possible example, an elastic cloud server (ECS) may be a virtual machine in the embodiments.

The elastic cloud server is a cloud server that can be obtained and automatically scaled at any time when needed. The ECS eliminates preparations of purchasing IT hardware, and a server is used easily and efficiently as public resources such as water, electricity, and natural gas. This implements instant availability and auto scaling of computing resources. The auto scaling means configure server resources such as a CPU, a memory, and a bandwidth based on service requirements.

A virtual private network (VPN) is a private network established on a public network for encrypted communication.

The Internet Protocol version 6 (IPv6) is a next-generation IP protocol designed by the Internet Engineering Task Force (IETF) to replace the Internet Protocol version 4 (IPv4).

The embodiments provide a business service providing method. A remote acceleration gateway performs destination address translation on a service request packet sent by a client, encapsulates a service request packet obtained after the destination address translation, and sends the encapsulated service request packet to a border gateway on which a virtual machine is located. Then, the border gateway sends the encapsulated service request packet to a virtual forwarding device, and then the virtual forwarding device sends the service request packet to the virtual machine. Different from a related technology, in a process of sending the service request packet to the virtual machine, address translation is not performed on a source address of the service request packet. The source address of the service request packet sent to the virtual machine is still an address of the client, so that the virtual machine can learn of the source IP address of the service request packet received by the virtual machine, and transparent transmission of the source address of the service request packet is implemented. This helps the virtual machine implement functions such as statistics and analysis functions based on the source address.

FIG. 1 is a schematic diagram of an application scenario related to a business service providing method according to an embodiment. As shown in FIG. 1, the application scenario includes a client 10, a remote acceleration gateway 20, and a business service providing system. The business service providing system may include a border gateway 30, a virtual forwarding device, and a virtual machine 50. The virtual machine 50 is configured to provide a business service for the client 10. In addition, in the application scenario related to the business service providing method, one or more border gateways may be deployed. For example, a plurality of border gateways may be deployed in the application scenario, and a plurality of virtual forwarding devices deployed in the application scenario each are connected to a different border gateway. FIG. 1 is a schematic diagram in which one border gateway is deployed in the application scenario.

Optionally, the remote acceleration gateway 20 and the business service providing system may be connected through a border network of a global backbone network, a data center network (DCN), or a data center. This is not limited in the embodiments. In addition, a POP may be deployed outside an edge of a network used to connect the remote acceleration gateway 20 and the business service providing system, and the remote acceleration gateway 20 may be deployed at the POP.

In a possible implementation, the virtual forwarding device may be a virtual switch. FIG. 1 is a schematic diagram in which the virtual forwarding device is a virtual switch. As shown in FIG. 1, the business service providing system may include the border gateway 30, a virtual switch 40, and the virtual machine 50.

In the application scenario shown in FIG. 1, the remote acceleration gateway 20 may communicate with the border gateway 30 in the business service providing system, the border gateway 30 may communicate with the virtual switch 40, and the virtual switch 40 may receive a packet sent by the border gateway 30 and send the packet to the virtual machine 50, or the virtual switch 40 may send, to the border gateway 30, a packet sent by the virtual machine 50.

It should be noted that the virtual machine 50 may alternatively be another system or device such as a container that can provide a business service. This is not limited in the embodiments.

Figure 2:
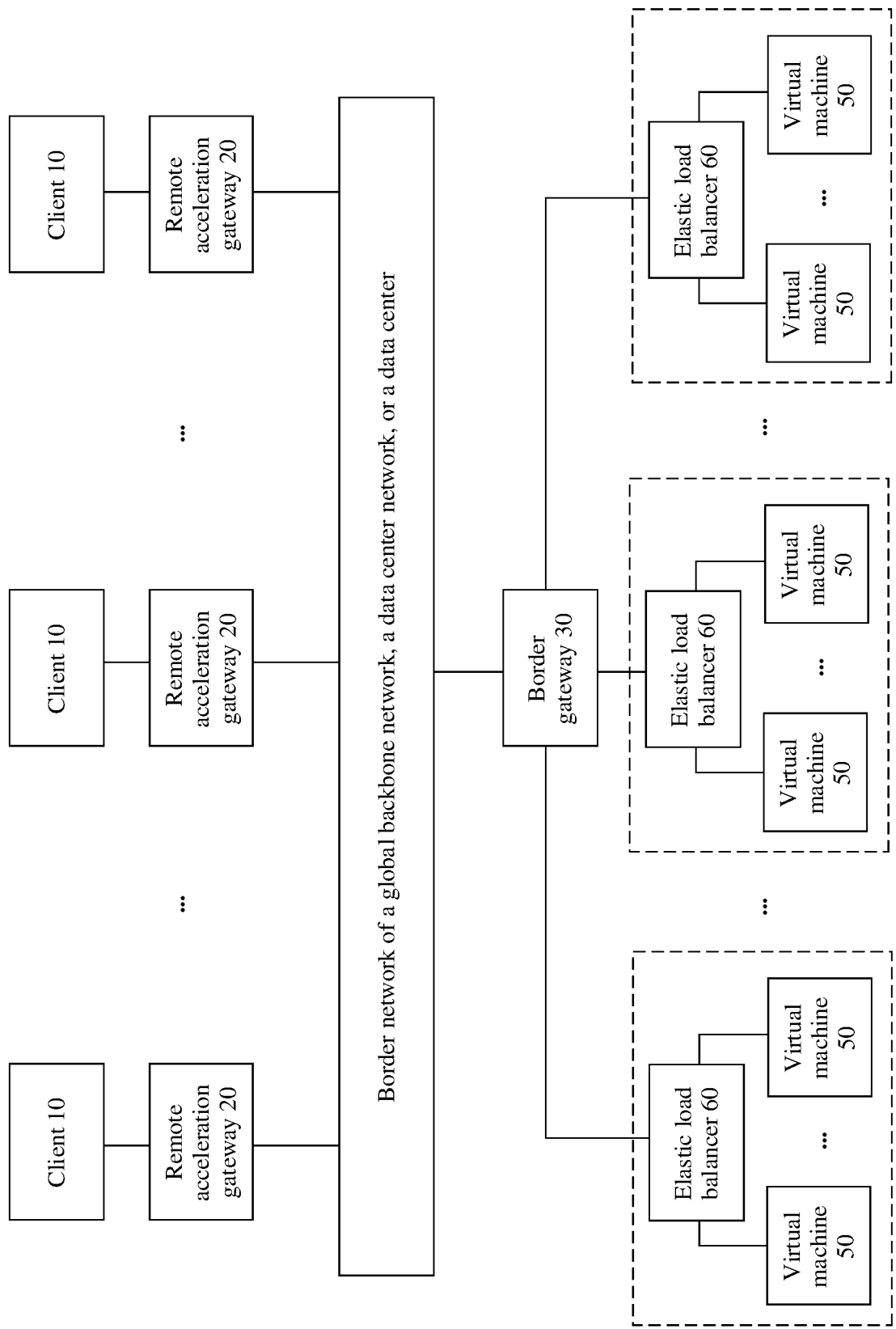
FIG. 2 is a schematic diagram of another application scenario related to a business service providing method according to an embodiment.

In another possible implementation, the virtual forwarding device may be an elastic load balancer. FIG. 2 is a schematic diagram in which the virtual forwarding device is an elastic load balancer. As shown in FIG. 2, the business service providing system may include the border gateway 30, an elastic load balancer 60, and a plurality of virtual machines 50.

In the application scenario shown in FIG. 2, the remote acceleration gateway 20 may communicate with the border gateway 30 in the business service providing system, the border gateway 30 may communicate with the elastic load balancer 60, and the elastic load balancer 60 may distribute a received service to the plurality of virtual machines 50, or the elastic load balancer 60 may send, to the border gateway 30, a packet sent by the virtual machine 50.

In still possible implementation, the virtual forwarding device may alternatively be a NAT gateway, a VPN gateway, a gateway (referred to as an IPv6 gateway below) that processes an IPv6 packet, or the like. This is not limited in the embodiments.

Figure 3:
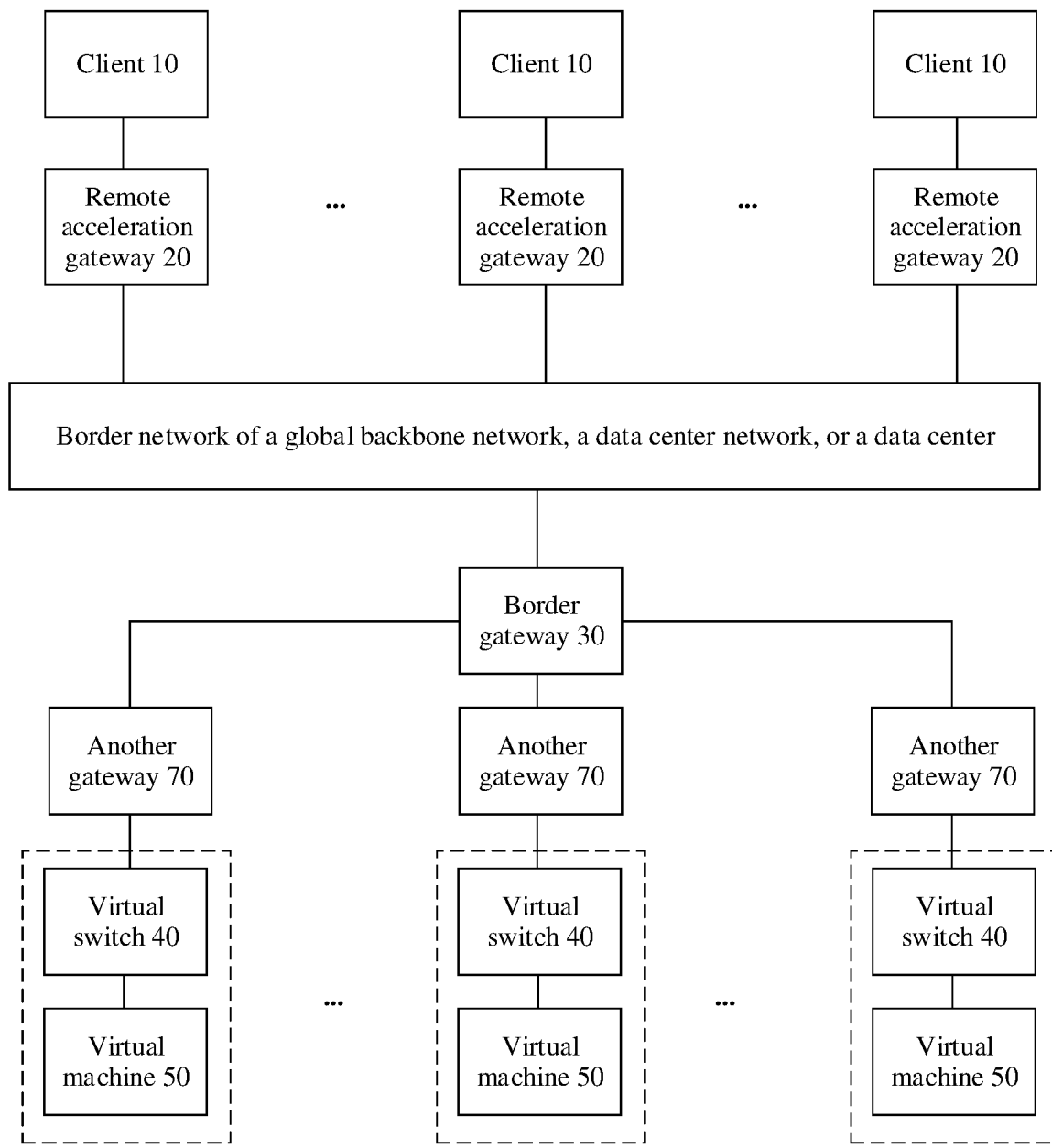
FIG. 3 is a schematic diagram of still another application scenario related to a business service providing method according to an embodiment.

In a possible implementation scenario, at least one another gateway may be further deployed between the border gateway and the virtual forwarding device. In this case, the border gateway may communicate with the virtual forwarding device by using the at least one another gateway. For example, corresponding to the application scenario shown in FIG. 1, as shown in FIG. 3, the business service providing system may further include another gateway 70 deployed between the border gateway 30 and the virtual forwarding device, and the border gateway 30 communicates with the virtual switch 40 by using the another gateway 70.

It should be noted that the gateway deployment manner in the embodiments may have a plurality of implementations. For example, a gateway may be deployed by using a virtual machine or may be deployed by using a physical server. This is not limited in the embodiments.

The following describes an implementation process of a business service providing method according to the embodiments. An example in which the remote acceleration gateway and the business service providing system are connected through a global backbone network is used to describe an implementation process of the business service providing method. In addition, the business service providing method includes an uplink process in which the client sends a service request packet to the virtual machine, and a downlink process in which the virtual machine sends a service response packet based on the service request packet to the client. The following separately describes the uplink process and the downlink process of the business service providing method.

Figure 4A:
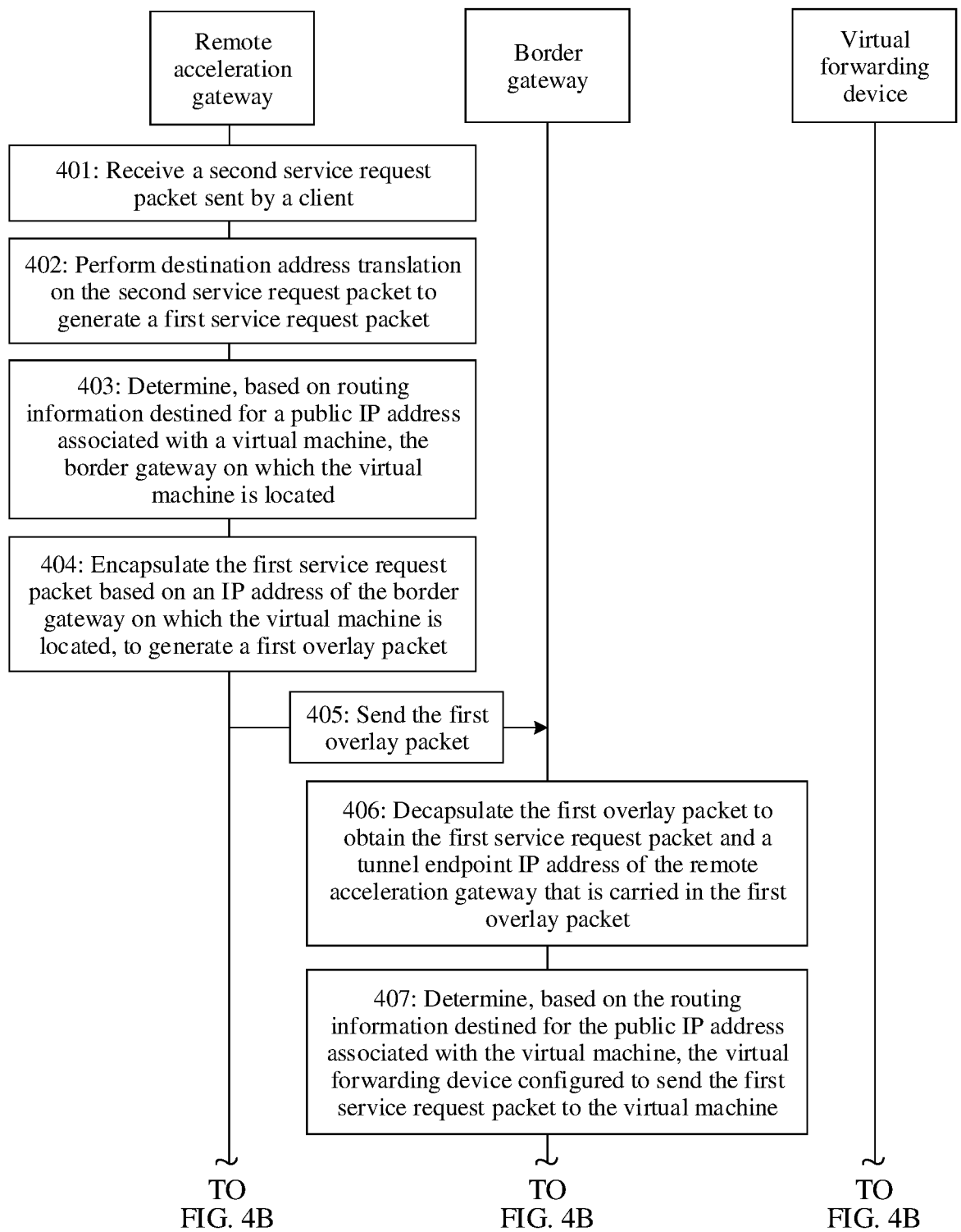
FIG. 4A and FIG. 4B are a flowchart of a business service providing method according to an embodiment.
Figure 4B:
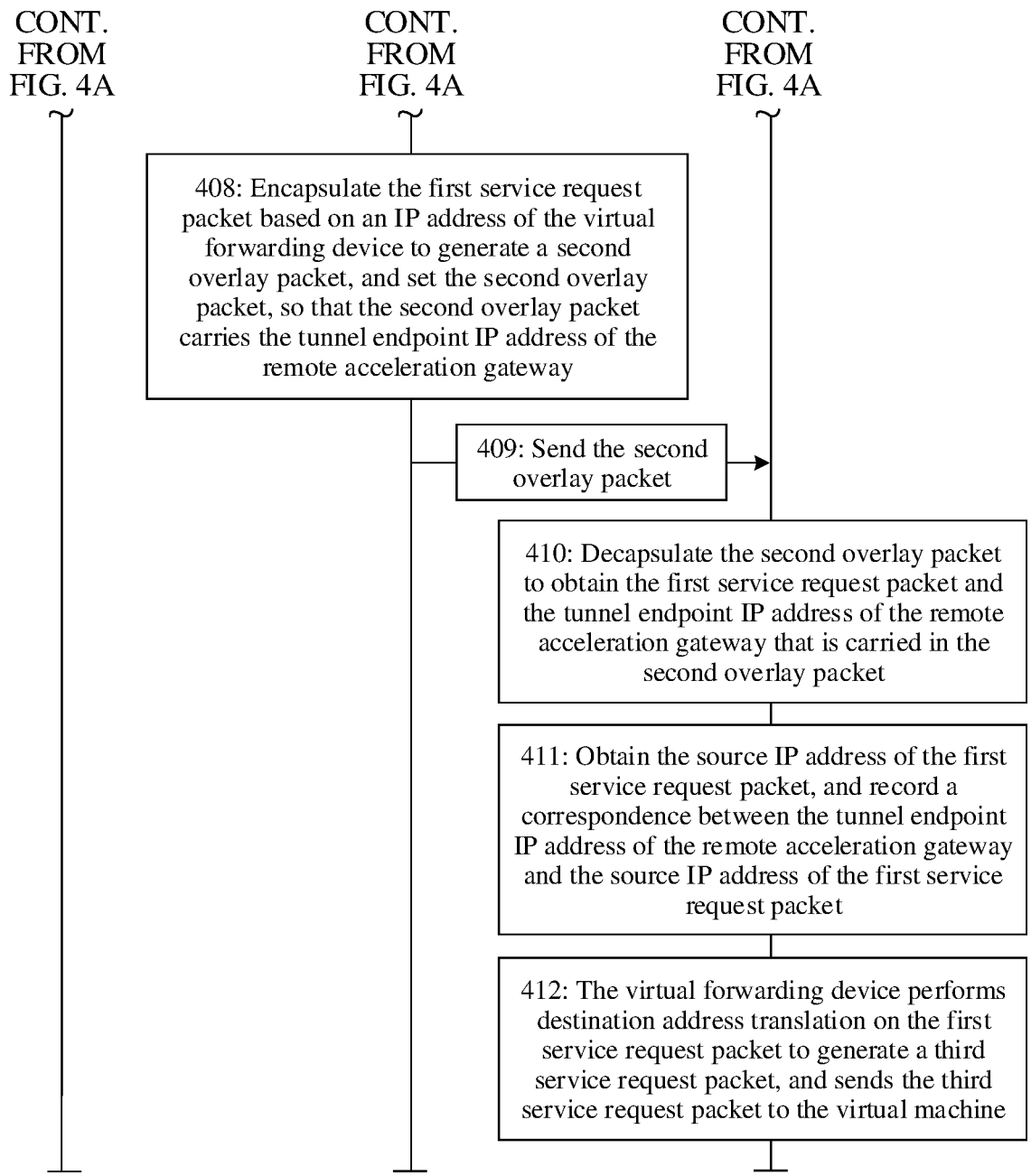

As shown in FIG. 4A and FIG. 4B, the uplink process of the business service providing method may include the following steps.

Step 401: A remote acceleration gateway receives a second service request packet sent by a client, where a source IP address of the second service request packet is an IP address of the client, and a destination IP address is an acceleration IP address of the remote acceleration gateway.

An IP address (for ease of differentiation, the IP address of the remote acceleration gateway that a user can access is referred to as the acceleration IP address of the remote acceleration gateway in the embodiments) of the remote acceleration gateway that the user can access may be bound to a public IP address associated with a virtual machine, so that the client can access the virtual machine by accessing the acceleration IP address of the remote acceleration gateway. When the client requires the virtual machine to provide a business service for the client, the client may send the second service request packet to the remote acceleration gateway, to request, by using the second service request packet, the virtual machine to provide the business service for the client. The destination IP address of the second service request packet is the acceleration IP address of the remote acceleration gateway, and the source IP address of the second service request packet is the IP address of the client.

After the client sends the second service request packet, the network may route the second service request packet based on the destination IP address of the second service request packet, send the second service request packet to the remote acceleration gateway, and send, by using the remote acceleration gateway, the second service request packet to the virtual machine (for ease of description, referred to as a virtual machine for short below) for which the public IP address that is associated with the virtual machine and that is bound to the acceleration IP address of the remote acceleration gateway is destined, so that the client accesses the virtual machine.

For example, in a cloud service scenario, the client may send the second service request packet to the remote acceleration gateway, to access a virtual machine in a data center by using the remote acceleration gateway, so as to request the virtual machine to provide resources in the data center for the client. In this case, the destination IP address of the second service request packet is the acceleration IP address of the remote acceleration gateway, the source IP address of the second service request packet is the IP address of the client, and a source port of the second service request packet is a port of the client.

Step 402: The remote acceleration gateway performs destination address translation on the second service request packet to generate a first service request packet, where a source IP address of the first service request packet is the IP address of the client, and a destination IP address is the public IP address associated with the virtual machine.

The acceleration IP address of the remote acceleration gateway is bound to the public IP address associated with the virtual machine, so that the client can access the virtual machine by accessing the remote acceleration gateway. Therefore, when receiving a service request packet, the remote acceleration gateway may determine that the service request packet is used to request the virtual machine to provide a business service for the client. Correspondingly, when receiving the second service request packet, the remote acceleration gateway may perform destination address translation on the second service request packet to generate the first service request packet. The source IP address of the first service request packet is the IP address of the client, and the destination IP address is the public IP address associated with the virtual machine. It should be noted that, before and after the destination address translation, a source port of the first service request packet does not change compared with the source port of the second service request packet and is still the port of the client.

A translation policy used when the remote acceleration gateway performs destination address translation on a received service request packet may be determined based on a binding relationship between the acceleration IP address of the remote acceleration gateway and the public IP associated with the virtual machine. For example, when the acceleration IP address of the remote acceleration gateway is bound to a public IP address associated with a virtual machine 1, the remote acceleration gateway may translate a destination IP address of the received service request packet into the public IP address associated with the virtual machine 1. When the acceleration IP address of the remote acceleration gateway is bound to a public IP address associated with a virtual machine 2, the remote acceleration gateway may translate a destination IP address of the received service request packet into the public IP address associated with the virtual machine 2.

In addition, the acceleration IP address of the remote acceleration gateway may also be bound to public IP addresses associated with a plurality of virtual machines. In this case, a service request packet sent by the client carries indication information used to indicate public IP addresses associated with different virtual machines. When receiving the service request packet sent by the client, the remote acceleration gateway translates, based on the indication information that is carried in the service request packet and that is used to indicate the public IP addresses associated with the different virtual machines, a destination IP address of the service request packet into a public IP address that is associated with a virtual machine and that is indicated by the indication information.

It should be noted that the public IP address associated with the virtual machine is a public IP address of a device that can send a packet to the virtual machine. For example, when a virtual forwarding device is a virtual switch, the public IP address associated with the virtual machine is a public IP address bound to the virtual machine. In this case, when a destination IP address of a packet is the public IP address bound to the virtual machine, the packet can be sent by the virtual switch to the virtual machine indicated by the public IP address.

When the virtual forwarding device is a load balancer, the public IP address associated with the virtual machine is a public IP address bound to the load balancer. In this case, when a destination IP address of a packet is the public IP address bound to the load balancer, the packet can be sent to the load balancer indicated by the public IP address, and the packet is sent, by using a load balancing service provided by the load balancer, to a virtual machine that can provide a service.

When the virtual forwarding device is an IPv6 gateway, the public IP address associated with the virtual machine is a public IPv6 address of the virtual machine. In this case, when a destination IP address of a packet is the public IPv6 address of the virtual machine, the packet can be sent by the IPv6 gateway to the virtual machine indicated by the public IPv6 address.

When the virtual forwarding device is a VPN gateway, the public IP address associated with the virtual machine is a public IP address bound to the VPN gateway. In this case, when a destination IP address of a packet is the public IP address bound to the VPN gateway, the packet can be sent to the VPN gateway, and the packet is sent by the VPN gateway to the virtual machine indicated by the packet.

When the virtual forwarding device is a NAT gateway, the public IP address associated with the virtual machine is a public IP address bound to the NAT gateway. In this case, when a destination IP address of a packet is the public IP address bound to the NAT gateway, the packet can be sent to the NAT gateway, and the packet is sent by the NAT gateway to the corresponding virtual machine.

Step 403: The remote acceleration gateway determines, based on routing information destined for the public IP address associated with the virtual machine, a border gateway on which the virtual machine is located.

In a process of binding the acceleration IP address of the remote acceleration gateway to the public IP address associated with the virtual machine, the routing information used for sending a packet between the remote acceleration gateway and the virtual machine is also determined. The routing information is used to indicate a path for sending a packet between the remote acceleration gateway and the virtual machine. The remote acceleration gateway may determine, by querying the routing information destined for the public IP address associated with the virtual machine, that in a process in which the remote acceleration gateway sends the first service request packet to the virtual machine, the first service request packet needs to pass through an intermediate device. The remote acceleration gateway sends the received first service request packet to an intermediate device (namely, a next-hop device) logically nearest to the remote acceleration gateway in the path, so that the next-hop device forwards the first service request packet to the virtual machine.

For example, in the business service providing system shown in FIG. 1, in a process in which the remote acceleration gateway sends the first service request packet to the virtual machine, the first service request packet needs to sequentially pass through the remote acceleration gateway, the border gateway, the virtual forwarding device, and the virtual machine. That is, a routing path for sending the first service request packet to the virtual machine by the remote acceleration gateway is: the remote acceleration gateway—the border gateway—the virtual forwarding device—the virtual machine. It may be determined, based on routing information used to reflect the routing path, that a next-hop device of the remote acceleration gateway in the process in which the remote acceleration gateway sends the first service request packet to the virtual machine is the border gateway. In this case, the border gateway may be referred to as a border gateway on which the virtual machine is located.

Step 404: The remote acceleration gateway encapsulates the first service request packet based on an IP address of the border gateway on which the virtual machine is located, to generate a first overlay packet, where the first overlay packet carries a tunnel endpoint IP address of the remote acceleration gateway.

When the next-hop device of the remote acceleration gateway in the process in which the remote acceleration gateway sends the first service request packet to the virtual machine is the border gateway, endpoints of a tunnel used to transmit the first overlay packet are the remote acceleration gateway and the border gateway. In this case, an IP address that is in the IP address of the remote acceleration gateway and that is used to indicate a tunnel endpoint is referred to as a tunnel endpoint IP address of the remote acceleration gateway, and an IP address that is in the IP address of the border gateway and that is used to indicate a tunnel endpoint is referred to as a tunnel endpoint IP address of the border gateway. The first service request packet may be encapsulated based on first tunnel information including the tunnel endpoint IP address of the remote acceleration gateway and the tunnel endpoint IP address of the border gateway, to generate the first overlay packet. An outer destination IP address of the first overlay packet is the tunnel endpoint IP address of the border gateway, an outer source IP address is the tunnel endpoint IP address of the remote acceleration gateway, an inner destination IP address is the public IP address associated with the virtual machine, and an inner source IP address is the IP address of the client.

It should be noted that, in the business service providing method provided in this embodiment, when the border gateway, the virtual forwarding device, and another gateway transmit overlay packets, outer addresses of the transmitted overlay packets are all used to indicate a tunnel endpoint. Therefore, in the embodiments, the IP address of the border gateway is the tunnel endpoint IP address of the border gateway, the IP address of the virtual forwarding device is a tunnel endpoint IP address of the virtual forwarding device, and an IP address of the another gateway is a tunnel endpoint IP address of the another gateway. This is not distinguished in this embodiment.

An implementation in which the remote acceleration gateway encapsulates the first service request packet based on the first tunnel information, to generate the first overlay packet includes: adding a first tunnel header to the first service request packet, filling the first tunnel information in the first tunnel header, and obtaining the first overlay packet including the first tunnel header and the first service request packet. The first tunnel information includes the tunnel endpoint IP address of the remote acceleration gateway, the tunnel endpoint IP address of the border gateway, and an identifier of the tunnel used by the remote acceleration gateway and the border gateway. In an implementation, the first overlay packet may be a VXLAN packet or another type of overlay packet. For example, when the first overlay packet is a VXLAN packet, the first tunnel information includes a VXLAN tunnel endpoint (VTEP) IP address of the remote acceleration gateway, a VTEP IP address of the border gateway, and an identifier of a VXLAN tunnel used by the remote acceleration gateway and the border gateway.

It should be noted that there may be a plurality of implementations in which the first overlay packet carries the tunnel endpoint IP address of the remote acceleration gateway. For example, the tunnel endpoint IP address of the remote acceleration gateway may be used as an outer source IP address of an outer packet of the first overlay packet, to carry the tunnel endpoint IP address of the remote acceleration gateway. Alternatively, the tunnel endpoint IP address of the remote acceleration gateway is carried in an extension field in the first tunnel header of the first overlay packet, to carry the tunnel endpoint IP address of the remote acceleration gateway.

The following uses an example in which the first overlay packet is a VXLAN packet, and a used VXLAN protocol is a VXLAN Generic Protocol Extension (GPE) protocol and a VXLAN Generic Network Virtualization Encapsulation (geneve) protocol (namely, a VXLAN nvo3-geneve protocol), to describe an implementation in which the extension field in the first tunnel header of the first overlay packet carries the VXLAN IP address of the remote acceleration gateway.

Figure 5:
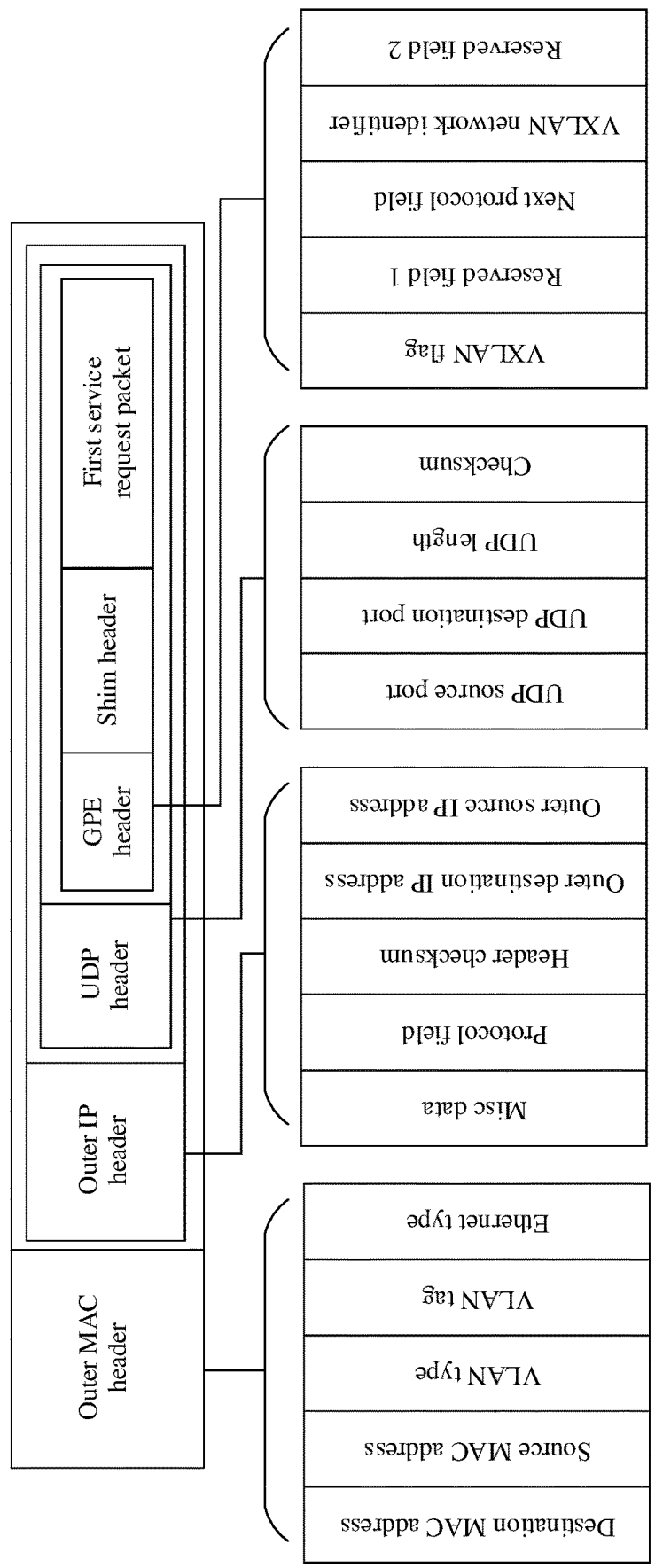
FIG. 5 is a schematic diagram of a structure of a VXLAN packet according to an embodiment.

When the used VXLAN protocol is the VXLAN GPE protocol, the first tunnel header in the VXLAN packet is a GPE header, and the GPE header carries a shim header. As shown in FIG. 5, the VXLAN packet includes the following content: the first service request packet, a GPE header carrying a shim header, a UDP header, an outer IP header, and an outer MAC header. The GPE header carrying the shim header is encapsulated outside the first service request packet, so that the first service request packet is transmitted as a VXLAN packet. The UDP header is encapsulated outside the first service request packet and the GPE header carrying the shim header, so that the first service request packet and the GPE header carrying the shim header are transmitted as UDP data. The outer IP header is encapsulated outside the UDP header. The outer MAC header is encapsulated outside the IP header. The VXLAN IP address of the remote acceleration gateway may be carried in the shim header.

The outer MAC header includes a destination MAC address field, a source MAC address field, a VLAN type field, a VLAN tag field, and an Ethernet type field.

The outer IP header includes a misc data field, a protocol field (protocol), a header checksum field, an outer destination IP address field, and an outer source IP address field that are of an IP header. An outer source IP address carried in the outer source IP address field is a VTEP IP address of a source end, and an outer destination IP address carried in the outer destination IP address field is a VTEP IP address of a destination end.

The UDP header includes a UDP source port field, a UDP destination port (also referred to as a VXLAN port) field, a UDP length field, and a checksum field.

The GPE header includes a VXLAN flag field, a reserved field 1, a next protocol field, a VXLAN network identifier (VNI) field, and a reserved field 2. In an implementation, the next protocol field in the VXLAN GPE header of the first overlay packet may be used to indicate whether the VXLAN packet carries the VTEP IP address of the remote acceleration gateway. For example, when the next protocol field is set to OxE1, it indicates that the VTEP IP address of the remote acceleration gateway is carried. In this case, the VTEP IP address of the remote acceleration gateway may be carried in the shim header of the first overlay packet.

Figure 6:
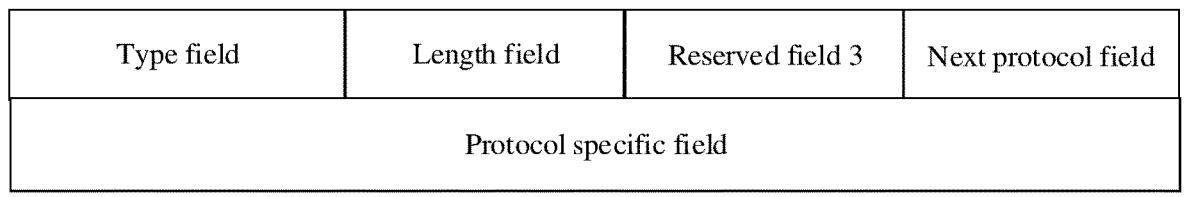
FIG. 6 is a schematic diagram of a structure of a shim header according to an embodiment.

As shown in FIG. 6, the shim header may be 8 bytes, and includes an 8-bit type field, an 8-bit length field, an 8-bit reserved 3 field, an 8-bit next protocol field, and a 32-bit protocol specific field. Content carried in the protocol specific field is the VTEP IP address of the remote acceleration gateway. In addition, the type field in the shim header may be set, to indicate an operation that needs to be performed by a gateway that receives the packet. For example, when the type field is set to X1, it indicates that a gateway that receives the packet needs to establish a correspondence between addresses (that is, perform address learning). When the type field is set to Y1, it indicates that the gateway that receives the packet directly forwards the packet based on the extension field. Values of X1 and Y1 may be determined according to an application scenario requirement. For example, a value of X1 is 1, and a value of Y1 is 2.

Figure 7:
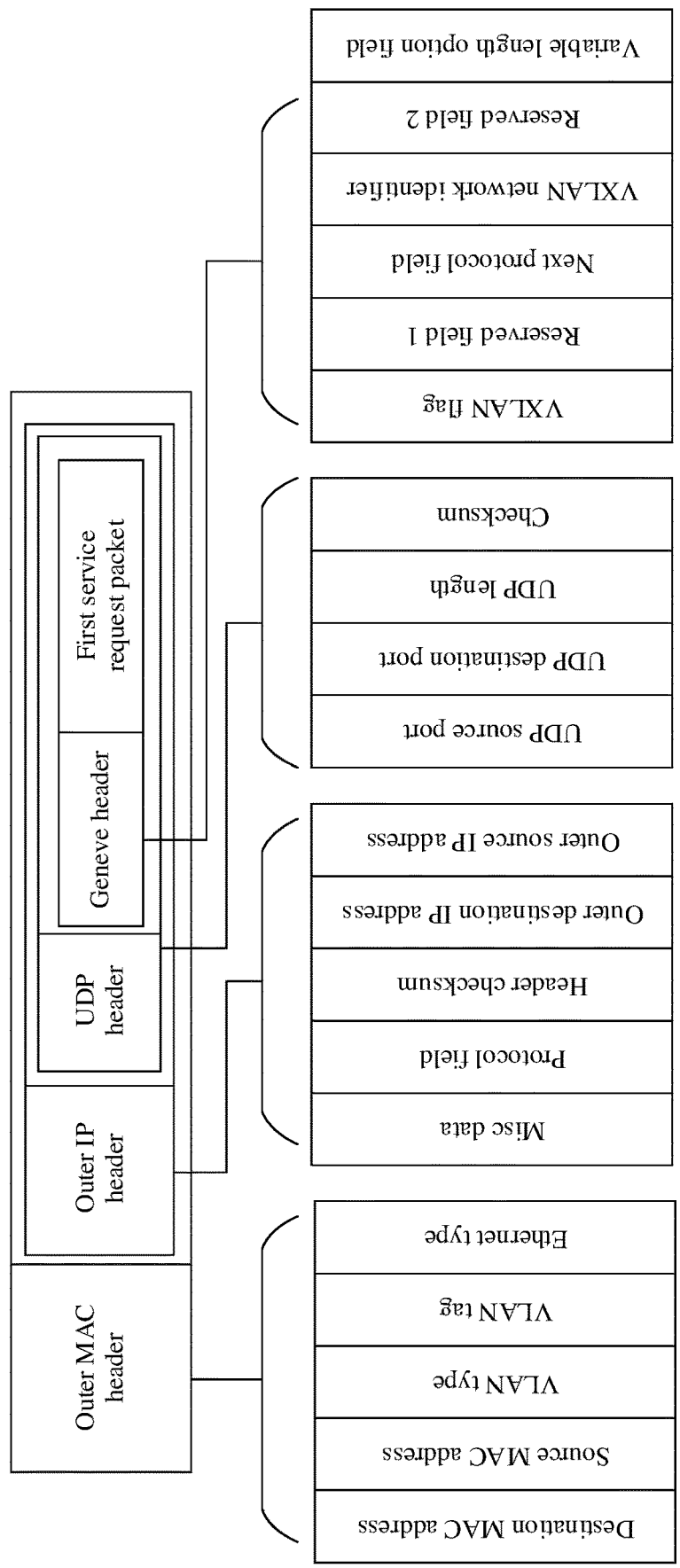
FIG. 7 is a schematic diagram of a structure of another VXLAN packet according to an embodiment.

When the used VXLAN protocol is the VXLAN nvo3-geneve protocol, the VXLAN header may be a geneve header. As shown in FIG. 7, a difference between the geneve header and the GPE header is that the geneve header does not carry a shim header, and the geneve header includes a variable length option field. As shown in FIG. 8, the geneve header includes a 2-bit version number field (ver), a 6-bit option length field (Opt Len), a 1-bit operation administration and maintenance (OAM) frame field (O), a 1-bit critical option flag field (C), a 6-bit reserved 4 field 4 4, a 16-bit protocol type field, a 24-bit VNI field, an 8-bit reserved 5 field 5, and a 32-bit variable length option field. In an implementation, the variable length option field of the first overlay packet may carry the VTEP IP address of the remote acceleration gateway.

As shown in FIG. 9, the variable length option field is 8 bytes, and includes a 16-bit optional class field, an 8-bit type field, three 1-bit reserved 6 field, a 5-bit length field, and a 32-bit variable option data field. Content carried in the variable option data field is the VTEP IP address of the remote acceleration gateway. In addition, when the type field in the variable option data field is set to X2, it indicates that a gateway that receives the packet needs to establish a correspondence between addresses (that is, perform address learning). When the type in the variable option data field is set to Y2, it indicates that the gateway that receives the packet directly forwards the packet based on the extension field. Values of X2 and Y2 may be determined according to an application scenario requirement. For example, a value of X2 is 1, and a value of Y2 is 2.

It should be noted that in addition to a manner of carrying the tunnel endpoint IP address of the remote acceleration gateway by using the extension fields of the VXLAN GPE protocol and the VXLAN nvo3-geneve protocol, another extension manner may be used, so that the tunnel endpoint IP address of the remote acceleration gateway is carried in the first tunnel header (or in the extension field of the first tunnel header) of the first overlay packet, and the carried tunnel endpoint IP address of the remote acceleration gateway is applicable to both IPv4 and IPv6. This is not limited in this embodiment.

Step 405: The remote acceleration gateway sends the first overlay packet to the border gateway on which the virtual machine is located.

After the remote acceleration gateway obtains the first overlay packet, the remote acceleration gateway may send, through a connection network between the remote acceleration gateway and the border gateway on which the virtual machine is located, the first overlay packet to the border gateway on which the virtual machine is located. The connection network between the remote acceleration gateway and the border gateway on which the virtual machine is located may be a border network of a global backbone network, a data center network, a data center, or the like.

Step 406: The border gateway decapsulates the first overlay packet to obtain the first service request packet and the tunnel endpoint IP address of the remote acceleration gateway that is carried in the first overlay packet.

After receiving the first overlay packet, the border gateway may decapsulate the first overlay packet, to obtain the first service request packet located at an inner layer of the first overlay packet and the tunnel endpoint IP address of the remote acceleration gateway that is carried in the first overlay packet. In this way, after receiving a service response packet for the first service request packet, the border gateway sends the service response packet to the remote acceleration gateway based on the tunnel endpoint IP address of the remote acceleration gateway, so that the remote acceleration gateway sends the service response packet to the client. An implementation of decapsulating the first overlay packet may include: removing the first tunnel information from the first overlay packet.

Step 407: The border gateway determines, based on the routing information destined for the public IP address associated with the virtual machine, the virtual forwarding device configured to send the first service request packet to the virtual machine.

For an implementation process of step 407, refer to an implementation process of step 403.

Step 408: The border gateway encapsulates the first service request packet based on the IP address of the virtual forwarding device to generate a second overlay packet and sets the second overlay packet to carry the tunnel endpoint IP address of the remote acceleration gateway.

For an implementation process in which the border gateway encapsulates the first service request to generate the second overlay packet, refer to an implementation process in which the remote acceleration gateway encapsulates the first service request packet to generate the first overlay packet. The first service request packet may be encapsulated by using second tunnel information, to generate the second overlay packet. The second tunnel information includes the IP address of the border gateway, the IP address of the virtual forwarding device, and an identifier of a tunnel used by the border gateway and the virtual forwarding device. An outer destination IP address of the second overlay packet is the IP address of the virtual forwarding device, an outer source IP address is the IP address of the border gateway, an inner destination IP address is the public IP address associated with the virtual machine, and an inner source IP address is the IP address of the client. The second overlay packet carries the tunnel endpoint IP address of the remote acceleration gateway.

An implementation in which the second overlay packet carries the tunnel endpoint IP address of the remote acceleration gateway may be: carrying the tunnel endpoint IP address of the remote acceleration gateway in an extension field in a second tunnel header of the second overlay packet. For a specific implementation, refer to an implementation in which the extension field in the first tunnel header of the first overlay packet carries the tunnel endpoint IP address of the remote acceleration gateway. Details are not described herein again.

Step 409: The border gateway sends the second overlay packet to the virtual forwarding device.

It should be noted that step 407 to step 409 are descriptions of a process in which the border gateway sends the first service request packet to the virtual forwarding device when the virtual forwarding device is a next-hop device of the border gateway in a process in which the border gateway sends a packet to the public IP address associated with the virtual machine. In another scenario, at least one another gateway may be further deployed between the border gateway and the virtual forwarding device. In this case, the second overlay packet sent by the border gateway may be sent to the virtual forwarding device by using the at least one another gateway hop by hop according to a route between the border gateway and the virtual forwarding device. In addition, the first service request packet is alternatively sent in a form of an overlay packet in a hop-by-hop sending process. For example, after an overlay packet in which the first service request packet is encapsulated arrives at another gateway, the another gateway also needs to first decapsulate the overlay packet in which the first service request packet is encapsulated, to obtain the first service request packet, and then encapsulates the first service request packet to obtain an overlay packet in which the first service request packet is encapsulated. Then, the another gateway sends the overlay packet to a gateway that serves as a next-hop device, until the first service request packet is sent to the virtual forwarding device. In a process of transmitting the overlay packet hop by hop, because a tunnel endpoint used to transmit the overlay packet changes, tunnel information used to encapsulate the first service request packet changes accordingly.

For example, when another gateway is further deployed between the border gateway and the virtual forwarding device, a process in which the border gateway sends the first service request packet to the virtual forwarding device is: The border gateway sends, to the another gateway, an overlay packet generated by encapsulation based on an IP address of the another gateway and the IP address of the border gateway. After receiving the overlay packet, the another gateway decapsulates the overlay packet to obtain the first service request packet, encapsulates the first service request packet based on the IP address of the virtual forwarding device and the IP address of the another gateway to generate an overlay packet, and then sends the overlay packet to the virtual forwarding device.

Step 410: The virtual forwarding device decapsulates the second overlay packet to obtain the first service request packet and the tunnel endpoint IP address of the remote acceleration gateway that is carried in the second overlay packet.

For an implementation process of step 410, refer to an implementation process of step 406.

Step 411: The virtual forwarding device obtains the source IP address of the first service request packet and records a correspondence between the tunnel endpoint IP address of the remote acceleration gateway and the source IP address of the first service request packet.

After obtaining the first service request packet, the virtual forwarding device may further perform address learning based on the first service request packet, to determine a remote acceleration gateway to which the service response packet should be sent when the service response packet for the first service request packet is sent to the client, and send the service response packet to the client by using the remote acceleration gateway, to implement retrieval of the service response packet.

Because the tunnel endpoint IP address of the remote acceleration gateway carried in the second overlay packet is used to indicate the remote acceleration gateway configured to send the service response packet to the client when the service response packet for the first service request packet is sent to the client, the source IP address of the first request packet may be obtained. That is, the IP address of the client is obtained. Then, the correspondence between the IP address of the client and the tunnel endpoint IP address of the remote acceleration gateway that is carried in the second overlay packet is established and recorded, so that the correspondence can be queried during retrieval, to determine the remote acceleration gateway configured to send the service response packet to the client.

In addition, as described above, when the type field in the shim header is set to X1, it indicates that a gateway that receives the packet needs to establish a correspondence between addresses (that is, perform address learning). When the type field is set to Y1, it indicates that the gateway that receives the packet directly forwards the packet based on the extension field. Therefore, when the second overlay packet includes a shim header, a type field in the shim header in the second overlay packet may be preset to X1, to indicate the virtual forwarding device to perform address learning. Similarly, when the second overlay packet includes a geneve header, a type field in the geneve header in the second overlay packet may be preset to X2, to indicate the virtual forwarding device to perform address learning.

It should be noted that address learning may alternatively be performed based on a 2-tuple, a 3-tuple, a 4-tuple, or a 5-tuple including the source IP address of the first service request packet. This is not limited in this embodiment. For example, when the 2-tuple is the source IP address and the destination IP address of the first service request packet, the virtual forwarding device may separately obtain the source IP address and the destination IP address of the first service request packet, obtain the tunnel endpoint IP address of the remote acceleration gateway carried in the second overlay packet, and establish and record a correspondence between the source IP address of the first service request packet, the destination IP address of the first service request packet, and the tunnel endpoint IP address of the remote acceleration gateway carried in the second overlay packet. When the 5-tuple is the source IP address, the destination IP address, the source port, a destination port, and a used transport layer protocol of the first service request packet, the virtual forwarding device may separately obtain the source IP address, the destination IP address, the source port, the destination port, and the used transport layer protocol of the first service request packet, obtain the tunnel endpoint IP address of the remote acceleration gateway carried in the second overlay packet, and establish and record a correspondence between the source IP address, the destination IP address, the source port, the destination port, and the transport layer protocol of the first service request packet, and the tunnel endpoint IP address of the remote acceleration gateway carried in the second overlay packet.

It should be further noted that, address learning may be alternatively performed based on a network identifier of an overlay network used to transmit the overlay packet in which the first service request packet is encapsulated, and a 1-tuple, a 2-tuple, a 3-tuple, a 4-tuple, or a 5-tuple including the source IP address of the first service request packet. For example, when the virtual forwarding device performs address learning based on the network identifier of the overlay network and the source IP address of the first service request packet, the virtual forwarding device may obtain the network identifier of the overlay network used to transmit the first service request packet, obtain the source IP address of the first service request packet, obtain the tunnel endpoint IP address of the remote acceleration gateway carried in the second overlay packet, and establish and record a correspondence between the network identifier of the overlay network, the source IP address of the first service request packet, and the tunnel endpoint IP address of the remote acceleration gateway. When the first service request packet is transmitted through a VXLAN, the network identifier of the overlay network is a VNI.

When an overlay network is used to transmit an overlay packet in which the first service request packet is encapsulated, the overlay network that needs to be used needs to be determined based on the network identifier, and the overlay packet is transmitted through the overlay network indicated by the network identifier. In addition, in a related technology, the network identifier needs to be manually set. Therefore, in this embodiment, address learning is performed based on the network identifier of the overlay network used to transmit the first service request packet, and the correspondence can be established based on the address learning. In this way, the network identifier of the overlay network configured to send the overlay packet whose destination IP address is the source IP address of the first service request packet can be automatically determined. That is, automatic configuration of the network identifier is implemented, and manual intervention in a process of configuring the network identifier can be reduced. This improves sending efficiency and accuracy of the overlay packet.

Step 412: The virtual forwarding device performs destination address translation on the first service request packet to generate a third service request packet and sends the third service request packet to the virtual machine.

When a packet is transmitted on a public network, both a destination IP address and a source IP address carried in the packet are public IP addresses, and the virtual machine is located on a private network side and receives a packet whose destination IP address is a private IP address of the virtual machine. Therefore, before sending the first service request packet to the virtual machine, the virtual forwarding device may further perform destination address translation on the first service request packet, translate a destination address of the first service request packet from the public IP address associated with the virtual machine into the private IP address of the virtual machine, and send, to the virtual machine, the first service request packet (that is, the third service request packet) obtained after the destination address translation, so that the virtual machine sends a service response packet to the client based on the third service request packet, to provide a business service for the client. Before and after the destination address translation, a source port of the third service request packet does not change compared with the source port of the first service request packet and is still the port of the client.

It should be noted that at least one gateway may be further disposed between the virtual forwarding device and the virtual machine. In this case, the service request packet may be sent to the virtual machine according to a route. In addition, the destination address translation on the first service request packet may be performed by any one of the virtual forwarding device and the at least one gateway.

In the business service providing method provided in this embodiment, the remote acceleration gateway performs destination address translation on a service request packet sent by the client, encapsulates a service request packet obtained after the destination address translation, and sends the encapsulated service request packet to the border gateway on which the virtual machine is located. Then, the border gateway sends the encapsulated service request packet to the virtual forwarding device, and then the virtual forwarding device sends the service request packet to the virtual machine. Different from a related technology, in a process of sending the service request packet to the virtual machine, address translation is not performed on a source IP address of the service request packet. The source IP address of the service request packet sent to the virtual machine is still the IP address of the client, so that the virtual machine can learn of the source IP address of the service request packet received by the virtual machine, and transparent transmission of the source address of the service request packet is implemented. This helps the virtual machine implement functions such as statistics and analysis functions based on the source IP address.

Figure 10A:
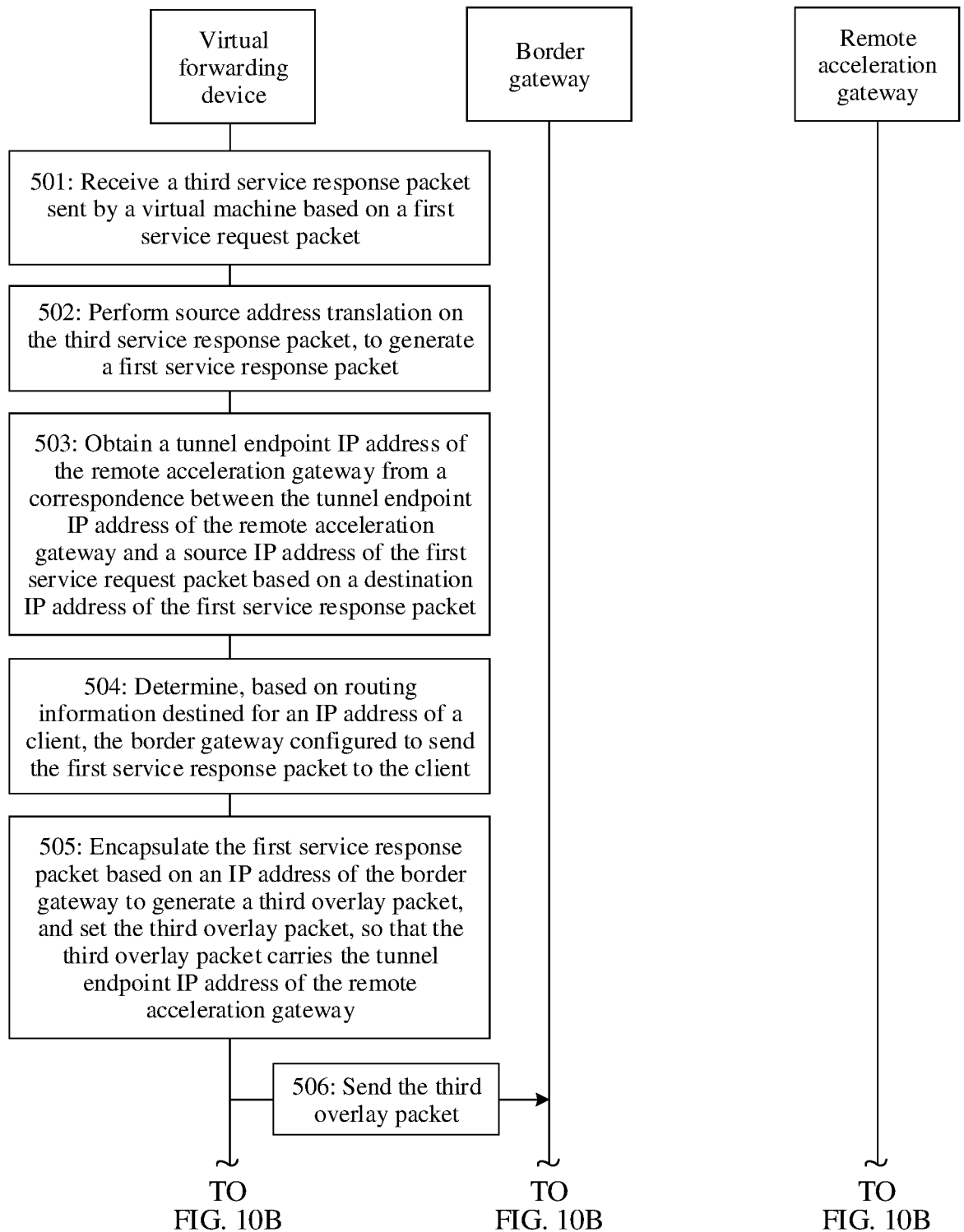
FIG. 10A and FIG. 10B are a flowchart of another business service providing method according to an embodiment.
Figure 10B:
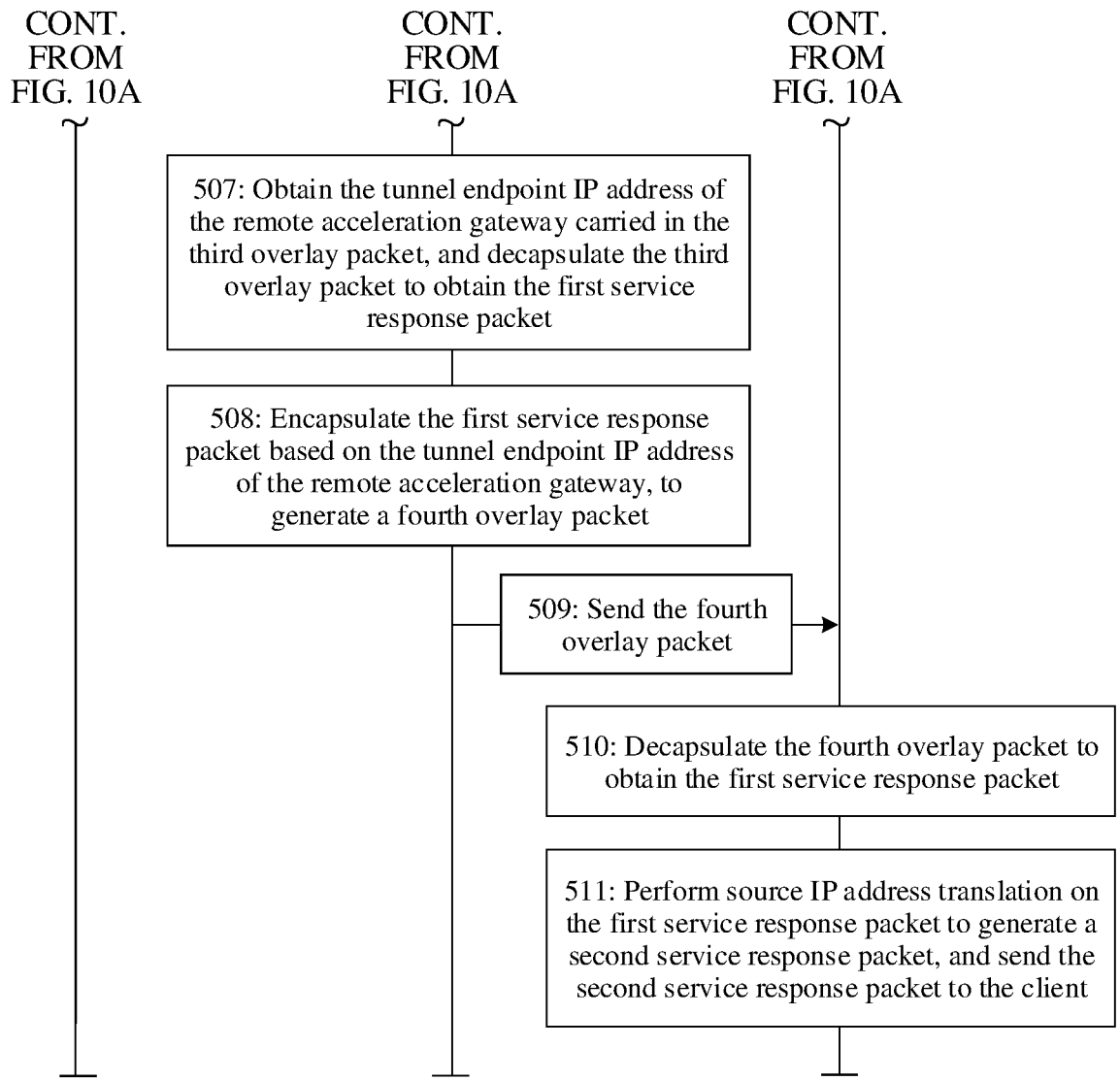

As shown in FIG. 10A and FIG. 10B, the downlink process of the business service providing method may include the following steps.

Step 501: A virtual forwarding device receives a third service response packet sent by a virtual machine based on a first service request packet, where a source IP address of the third service response packet is a private IP address of the virtual machine, and a destination IP address is an IP address of a client.

After receiving the first service request packet, the virtual machine may generate the third service response packet based on the first service request packet and send the third service response packet to the virtual forwarding device, to send the third service response packet to the client by using the virtual forwarding device, so as to provide a business service for the client.

In addition, when the virtual forwarding device is directly connected to the virtual machine, the third service response packet received by the virtual forwarding device is the third service response packet sent by the virtual machine. When at least one gateway is disposed between the virtual forwarding device and the virtual machine, the virtual machine sends the third service response packet to the virtual forwarding device by using routing, and the third service response packet received by the virtual forwarding device is a third service response packet forwarded by a previous-hop device of the virtual forwarding device in a routing path.

Step 502: The virtual forwarding device performs source address translation on the third service response packet, to generate the first service response packet.

When a packet is transmitted on a public network, both a destination IP address and a source IP address carried in the packet are public IP addresses, and the virtual machine is located on a private network side. In order that an IP address of the virtual machine is not exposed on the public network, before sending the third service response packet to a border gateway, the virtual forwarding device may further perform source address translation on the third service response packet, and translate the source IP address of the third service response packet from the private IP address of the virtual machine to a public IP address associated with the virtual machine, to obtain the first service response packet, so as to send the first service response packet to the border gateway. A source IP address of the first service response packet is the public IP address associated with the virtual machine, and a destination IP address is the IP address of the client. Before and after the source address translation, a destination port of the first service response packet does not change compared with a destination port of the third service response packet and is still a port of the client.

It should be noted that when at least one gateway is disposed between the virtual forwarding device and the virtual machine, the source address translation on the third service response packet may be performed by any one of the virtual forwarding device and the at least one gateway.

Step 503: The virtual forwarding device obtains a tunnel endpoint IP address of a remote acceleration gateway from a correspondence between the tunnel endpoint IP address of the remote acceleration gateway and a source IP address of the first service request packet based on the destination IP address of the first service response packet.

To ensure that the first service response packet can be sent to the client, the remote acceleration gateway configured to send the first service response packet to the client needs to be determined. In this case, the virtual forwarding device may query, based on the destination IP address of the first service response packet, the correspondence between the tunnel endpoint IP address of the remote acceleration gateway and the source IP address of the first service request packet recorded in the uplink process, to obtain the tunnel endpoint IP address of the remote acceleration gateway configured to send the first service response packet to the client.

Step 504: The virtual forwarding device determines, based on routing information destined for the IP address of the client, the border gateway configured to send the first service response packet to the client.

For an implementation process of step 504, refer to an implementation process of step 403.

Step 505: The virtual forwarding device encapsulates the first service response packet based on an IP address of the border gateway to generate a third overlay packet and sets the third overlay packet to carry the tunnel endpoint IP address of the remote acceleration gateway.

For an implementation process of step 505, refer to an implementation process of step 408. Third tunnel information used when the first service response packet is encapsulated to generate the third overlay packet includes an IP address of the virtual forwarding device, the IP address of the border gateway, and an identifier of a tunnel used by the virtual forwarding device and the border gateway. An outer destination IP address of the third overlay packet is the IP address of the border gateway, an outer source IP address is the IP address of the virtual forwarding device, an inner destination IP address is the IP address of the client, and an inner source IP address is the public IP address associated with the virtual machine.

Step 506: The virtual forwarding device sends the third overlay packet to the border gateway.

It should be noted that step 504 to step 506 are descriptions of a process in which the virtual forwarding device sends the first service request packet to the border gateway when the border gateway is a next-hop device of the virtual forwarding device in a process in which the virtual forwarding device sends a packet to the client. In another scenario, at least one another gateway may be further deployed between the border gateway and the virtual forwarding device. In this case, the third overlay packet sent by the virtual forwarding device may be sent to the border gateway by using the at least one another gateway hop by hop according to a route between the border gateway and the virtual forwarding device. In addition, the first service response packet is alternatively sent in a form of an overlay packet in a hop-by-hop sending process. For example, after an overlay packet in which the first service response packet is encapsulated arrives at another gateway, the another gateway also needs to first decapsulate the overlay packet in which the first service response packet is encapsulated, to obtain the first service response packet, and then encapsulates the first service response packet to obtain an overlay packet in which the first service response packet is encapsulated. Then, the another gateway sends the overlay packet to a gateway that serves as a next-hop device, until the first service request packet is sent to the border gateway. In a process of transmitting the overlay packet hop by hop, because a tunnel endpoint used to transmit the overlay packet changes, tunnel information used to encapsulate the first service response packet changes accordingly.

For example, when another gateway is further deployed between the border gateway and the virtual forwarding device, a process in which the virtual forwarding device sends the first service response packet to the border gateway is: The virtual forwarding device sends, to the another gateway, an overlay packet obtained by encapsulation based on an IP address of the another gateway and the IP address of the virtual forwarding device. After receiving the overlay packet, the another gateway decapsulates the overlay packet to obtain the first service response packet, encapsulates the first service response packet based on the IP address of the border gateway and the IP address of the another gateway to generate an overlay packet, and then sends the overlay packet to the border gateway.

Step 507: After receiving the third overlay packet, the border gateway obtains the tunnel endpoint IP address of the remote acceleration gateway carried in the third overlay packet, and decapsulates the third overlay packet to obtain the first service response packet.

For an implementation process of step 507, refer to an implementation process of step 406.

Step 508: The border gateway encapsulates the first service response packet based on the tunnel endpoint IP address of the remote acceleration gateway, to generate a fourth overlay packet.

After obtaining the tunnel endpoint IP address of the remote acceleration gateway, the border gateway may directly encapsulate the first service response packet based on the tunnel endpoint IP address of the remote acceleration gateway. Fourth tunnel information used when the first service response packet is encapsulated to generate the fourth overlay packet includes the tunnel endpoint IP address of the remote acceleration gateway, the IP address of the border gateway, and an identifier of a tunnel used by the remote acceleration gateway and the border gateway. An outer destination IP address of the fourth overlay packet is the tunnel endpoint IP address of the remote acceleration gateway, an outer source IP address is the IP address of the border gateway, an inner destination IP address is the IP address of the client, and an inner source IP address is the public IP address associated with the virtual machine.

Step 509: The border gateway sends the fourth overlay packet to the remote acceleration gateway based on the tunnel endpoint IP address of the remote acceleration gateway.

Step 510: The remote acceleration gateway decapsulates the fourth overlay packet to obtain the first service response packet.

Step 511: The remote acceleration gateway performs source IP address translation on the first service response packet to generate a second service response packet and sends the second service response packet to the client.

The client communicates with a device in a public network by using the remote acceleration gateway, according to a communication protocol, a source IP address of a packet that can be received by the client should be an acceleration IP address of the remote acceleration gateway. Therefore, in order that the client receives the first service response packet, the remote acceleration gateway needs to perform source IP address translation on the first service response packet, translate the source IP address of the first service response packet from the private IP address of the virtual machine to the acceleration IP address of the remote acceleration gateway, to obtain the second service response packet, and send the second service response packet to the client, so that the client uses a business service provided by using the second service response packet. That is, a source IP address of the second service response packet is the acceleration IP address of the remote acceleration gateway, and a destination IP address is the IP address of the client. Before and after the source address translation, a destination port of the second service response packet does not change compared with the destination port of the first service response packet, and is still the port of the client.

In this embodiment, the virtual forwarding device records the correspondence between the acceleration IP address of the remote acceleration gateway and the IP address of the client in the uplink process, and queries the correspondence in the downlink process, to obtain the tunnel endpoint IP address of the remote acceleration gateway, and uses the third overlay packet sent by the virtual forwarding device to the border gateway to carry the tunnel endpoint IP address of the remote acceleration gateway, so that the border gateway can send the fourth overlay packet to the remote acceleration gateway based on the tunnel endpoint IP address of the remote acceleration gateway. In this way, the remote acceleration gateway sends the first service response packet for the first service request packet to the client, to implement retrieval of the first service response packet.

The embodiments further provide a business service providing system. As shown in FIG. 1, FIG. 2, or FIG. 3, the business service providing system includes a border gateway, a virtual forwarding device, and a virtual machine. The virtual machine is configured to provide a business service for a client.

The border gateway is configured to receive a first overlay packet sent by a remote acceleration gateway, decapsulate the first overlay packet to obtain a first service request packet, encapsulate the first service request packet to generate a second overlay packet, and send the second overlay packet to the virtual forwarding device. The first service request packet is encapsulated in the first overlay packet, a source Internet Protocol (IP) address of the first service request packet is an IP address of the client, and a destination IP address is a public IP address associated with the virtual machine.

The virtual forwarding device is configured to decapsulate the second overlay packet to obtain the first service request packet and send the first service request packet to the virtual machine.

The virtual machine may alternatively be another system or device such as a container that can provide a business service.

In an implementation, the virtual forwarding device is a virtual switch, and the public IP address associated with the virtual machine is a public IP address bound to the virtual machine.

In another implementation, the virtual forwarding device is a load balancer, the load balancer provides a load balancing service for the virtual machine, and the public IP address associated with the virtual machine is a public IP address bound to the load balancer.

In still another implementation, the virtual forwarding device is an IPv6 gateway, and the public IP address associated with the virtual machine is a public IPv6 address of the virtual machine.

In yet another implementation, the virtual forwarding device is a VPN gateway, and the public IP address associated with the virtual machine is a public IP address bound to the VPN gateway.

In still yet another implementation, when the virtual forwarding device is a NAT gateway, the public IP address associated with the virtual machine is a public IP address bound to the NAT gateway.

The first overlay packet carries an IP address of the remote acceleration gateway, and the border gateway is further configured to obtain the IP address of the remote acceleration gateway carried in the first overlay packet and set the second overlay packet to carry the IP address of the remote acceleration gateway. Correspondingly, the virtual forwarding device is further configured to obtain the IP address of the remote acceleration gateway carried in the second overlay packet, obtain the source IP address of the first service request packet, and record a correspondence between the IP address of the remote acceleration gateway and the IP address of the client. The source IP address of the first service request packet is the IP address of the client.

In addition, the virtual forwarding device is further configured to receive a first service response packet sent by the virtual machine based on the first service request packet, obtain the IP address of the remote acceleration gateway from the correspondence based on a destination IP address of the first service response packet, encapsulate the first service response packet to generate a third overlay packet, and send the third overlay packet to the border gateway, where the third overlay packet carries the IP address of the remote acceleration gateway. A destination IP address of the first service response packet is the IP address of the client.

Correspondingly, the border gateway is further configured to obtain the IP address of the remote acceleration gateway carried in the third overlay packet, decapsulate the third overlay packet to obtain the first service response packet, encapsulate the first service response packet to generate a fourth overlay packet, and send the fourth overlay packet to the remote acceleration gateway based on the IP address of the remote acceleration gateway.

It may be clearly understood by a person skilled in the art that, for the purpose of convenient and brief description, for detailed working processes of the devices in the business service providing system, refer to descriptions of corresponding devices in the foregoing method embodiments. Details are not described herein again.

The embodiments further provide a remote acceleration gateway. The remote acceleration gateway is configured to receive a second service request packet sent by a client, where a source IP address of the second service request packet is an IP address of the client, and a destination IP address is an IP address of the remote acceleration gateway.

The remote acceleration gateway is further configured to perform destination address translation on the second service request packet to generate a first service request packet, where a source IP address of the first service request packet is the IP address of the client, a destination IP address is a public IP address associated with a virtual machine, and the virtual machine is configured to provide a business service for the client The remote acceleration gateway is further configured to encapsulate the first service request packet to generate a first overlay packet, where the first overlay packet carries the IP address of the remote acceleration gateway.

The remote acceleration gateway is further configured to send the first overlay packet to a border gateway on which the virtual machine is located.

Optionally, the remote acceleration gateway is further configured to receive a fourth overlay packet sent by the border gateway, where a first service response packet is encapsulated in the fourth overlay packet, a source IP address of the first service response packet is the public IP address associated with the virtual machine, and a destination IP address is the IP address of the client.

The remote acceleration gateway is further configured to decapsulate the fourth overlay packet to obtain the first service response packet.

The remote acceleration gateway is further configured to perform source IP address translation on the first service response packet to generate a second service response packet, where a source IP address of the second service response packet is the IP address of the remote acceleration gateway, and a destination IP address is the IP address of the client.

The remote acceleration gateway is further configured to send the second service response packet to the client.

It may be clearly understood by a person skilled in the art that, for the purpose of convenient and brief description, for a detailed working process of the remote acceleration gateway, refer to descriptions in the foregoing method embodiments. Details are not described herein again.

Figure 11:
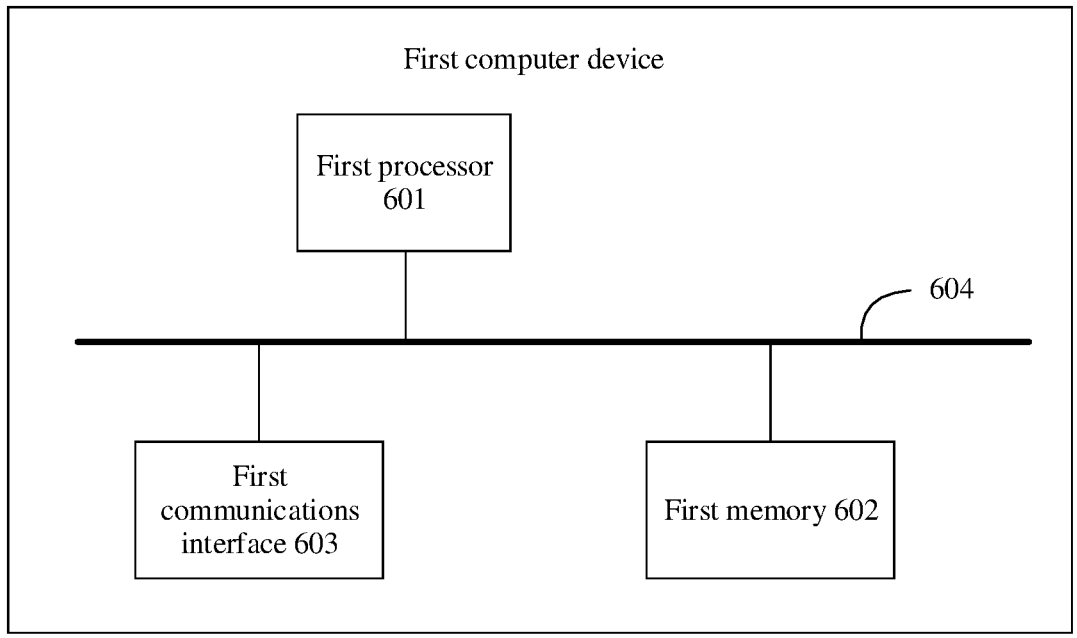
FIG. 11 is a schematic diagram of a structure of a first computer device according to an embodiment.

The embodiments provide a first computer device, and a border gateway may be deployed on the first computer device. FIG. 11 is an example of a possible architectural diagram of the first computer device. As shown in FIG. 11, the first computer device may include a first processor 601, a first memory 602, a first communications interface 603, and a first bus 604. In the first computer device, there may be one or more first processors 601, and FIG. 11 shows only one first processor 601. Optionally, the first processor 601 may be a central processing unit (CPU). If the first computer device has a plurality of first processors 601, types of the plurality of first processors 601 may be different or may be the same. Optionally, the plurality of first processors of the first computer device may be further integrated into a multi-core processor.

The first memory 602 stores computer instructions and data, and the first memory 602 may store computer instructions and data that are required for implementing a function of the border gateway in the business service providing method. The first memory 602 may be any one or any combination of the following storage media: a non-volatile memory (for example, a read-only memory (ROM), a solid state drive (SSD), a hard disk drive (HDD), an optical disc), or a volatile memory.

The first communications interface 603 may be any one or any combination of the following components with a network access function: a network interface (such as an Ethernet interface) and a wireless network interface card.

The first communications interface 603 is configured to perform data communication between the first computer device and another node or another computer device.

FIG. 11 also illustrates the first bus 604. The first bus 604 may connect the first processor 601 to the first memory 602 and the first communications interface 603. In this way, the first processor 601 may access the first memory 602 through the first bus 604 and may further exchange data with another node or another computer device through the first communications interface 603.

The first computer device executes the computer instructions in the first memory 602, to implement the function of the border gateway in the business service providing method. For example, the first computer device may execute the computer instructions in the first memory 602, to perform the following steps performed by the border gateway: The border gateway receives a first overlay packet sent by a remote acceleration gateway, decapsulates the first overlay packet to obtain a first service request packet, encapsulates the first service request packet to generate a second overlay packet, and sends the second overlay packet to a virtual forwarding device. In addition, for an implementation process in which the first computer device executes the computer instructions in the first memory 602, to perform the steps performed by the border gateway, refer to corresponding descriptions in the foregoing method embodiments.

Figure 12:
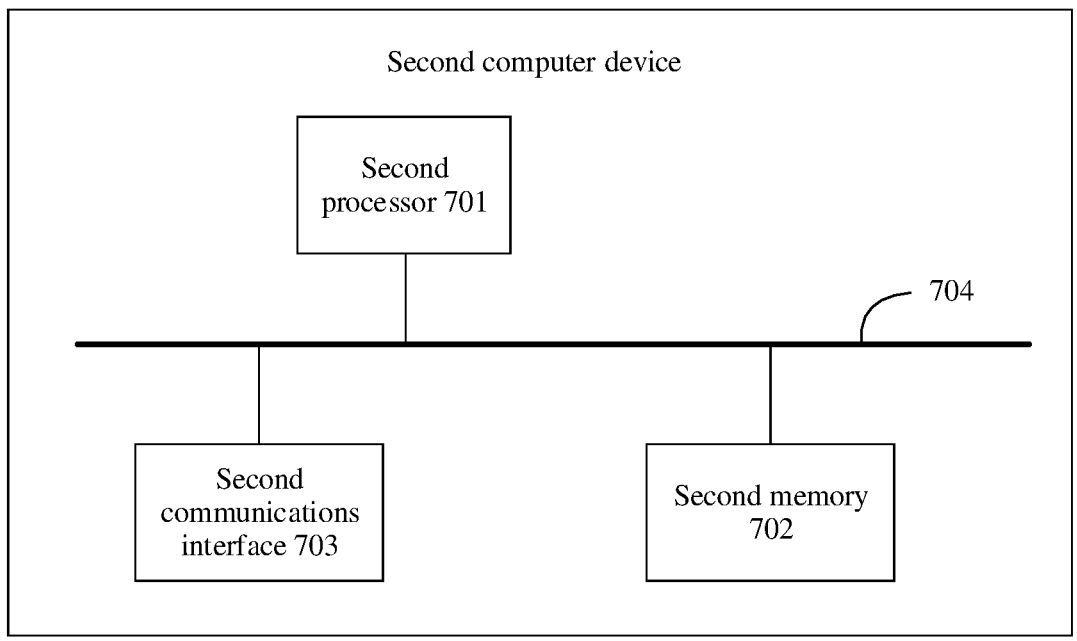
FIG. 12 is a schematic diagram of a structure of a second computer device according to an embodiment.

The embodiments provide a second computer device, and a virtual forwarding device and a virtual machine may be deployed on the second computer device. FIG. 12 is an example of a possible architectural diagram of the second computer device. As shown in FIG. 12, the second computer device may include a second processor 701, a second memory 702, a second communications interface 703, and a second bus 704. In the second computer device, there may be one or more second processors 701, and FIG. 12 shows only one second processor 701. Optionally, the second processor 701 may be a central processing unit. If the second computer device has a plurality of second processors 701, types of the plurality of second processors 701 may be different or may be the same. Optionally, the plurality of second processors of the second computer device may be further integrated into a multi-core processor.

The second memory 702 stores computer instructions and data, and the second memory 702 may store computer instructions and data that are required for implementing functions of the virtual forwarding device and the virtual machine in the business service providing method. The second memory 702 may be any one or any combination of the following storage media: a non-volatile memory (for example, a read-only memory, a solid state drive, a hard disk drive, an optical disc), or a volatile memory.

The second communications interface 703 may be any one or any combination of the following components with a network access function: a network interface (such as an Ethernet interface) and a wireless network interface card.

The second communications interface 703 is configured to perform data communication between the second computer device and another node or another computer device.

FIG. 12 also illustrates the second bus 704. The second bus 704 may connect the second processor 701 to the second memory 702 and the second communications interface 703. In this way, the second processor 701 may access the second memory 702 through the second bus 704 and may further exchange data with another node or another computer device through the second communications interface 703.

The second computer device executes the computer instructions in the second memory 702, to implement the functions of the virtual forwarding device and the virtual machine in the business service providing method. For example, the second computer device may execute the computer instructions in the second memory 702, to perform the following steps performed by the virtual forwarding device: The virtual forwarding device decapsulates a second overlay packet to obtain a first service request packet and sends the first service request packet to the virtual machine. In addition, for an implementation process in which the second computer device executes the computer instructions in the second memory 702, to perform the steps performed by the virtual forwarding device, refer to corresponding descriptions in the foregoing method embodiments.

Figure 13:
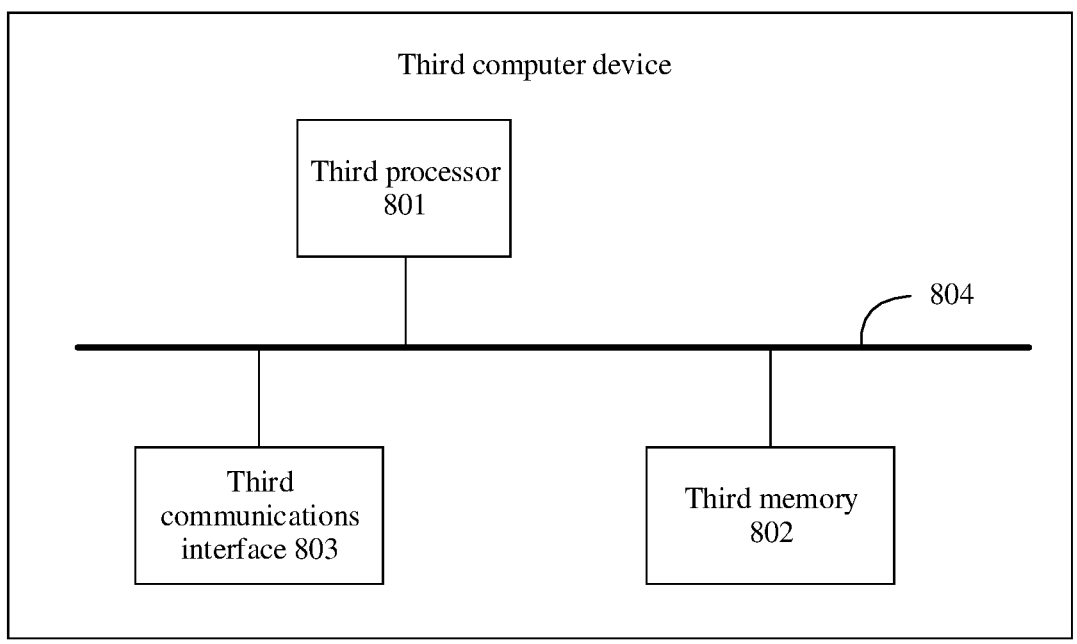
FIG. 13 is a schematic diagram of a structure of a third computer device according to an embodiment.

The embodiments provide a third computer device, and a remote acceleration gateway may be deployed on the third computer device. FIG. 13 is an example of a possible architectural diagram of the third computer device. As shown in FIG. 13, the third computer device may include a third processor 801, a third memory 802, a third communications interface 803, and a third bus 804. In the third computer device, there may be one or more third processors 801, and FIG. 13 shows only one third processor 801. Optionally, the third processor 801 may be a central processing unit. If the third computer device has a plurality of third processors 801, types of the plurality of third processors 801 may be different or may be the same. Optionally, the plurality of third processors of the third computer device may be further integrated into a multi-core processor.

The third memory 802 stores computer instructions and data, and the third memory 802 may store computer instructions and data that are required for implementing a function of the remote acceleration gateway in the business service providing method. The third memory 802 may be any one or any combination of the following storage media: a non-volatile memory (for example, a read-only memory, a solid state drive, a hard disk drive, an optical disc), or a volatile memory.

The third communications interface 803 may be any one or any combination of the following components with a network access function: a network interface (such as an Ethernet interface) and a wireless network interface card.

The third communications interface 803 is configured to perform data communication between the third computer device and another node or another computer device.

FIG. 13 also illustrates the third bus 804. The third bus 804 may connect the third processor 801 to the third memory 802 and the third communications interface 803. In this way, the third processor 801 may access the third memory 802 through the third bus 804 and may further exchange data with another node or another computer device through the third communications interface 803.

The third computer device executes the computer instructions in the third memory 802, to implement the function of the remote acceleration gateway in the business service providing method. For example, the third computer device may execute the computer instructions in the third memory 802, to perform the following steps performed by the remote acceleration gateway: The remote acceleration gateway receives a second service request packet sent by a client; the remote acceleration gateway performs destination address translation on the second service request packet to generate a first service request packet; the remote acceleration gateway encapsulates the first service request packet to generate a first overlay packet; and the remote acceleration gateway sends the first overlay packet to a border gateway on which a virtual machine is located. In addition, for an implementation process in which the third computer device executes the computer instructions in the third memory 802, to perform the steps performed by the remote acceleration gateway, refer to corresponding descriptions in the foregoing method embodiments.

The embodiments further provide a first storage medium. The first storage medium is a non-volatile computer-readable storage medium. When instructions in the first storage medium are executed by a processor, a function implemented by a border gateway in the business service providing method in the embodiments is implemented.

The embodiments further provide a second storage medium. The second storage medium is a non-volatile computer-readable storage medium. When instructions in the second storage medium are executed by a processor, a function implemented by a virtual forwarding device in the business service providing method in the embodiments is implemented.

The embodiments further provide a third storage medium. The third storage medium is a non-volatile computer-readable storage medium. When instructions in the third storage medium are executed by a processor, a function implemented by a remote acceleration gateway in the business service providing method in the embodiments is implemented.

The embodiments further provide a first computer program product including instructions. When the first computer program product is run on a computer, the computer is enabled to perform a function implemented by a border gateway in the business service providing method in the embodiments.

The embodiments further provide a second computer program product including instructions. When the second computer program product is run on a computer, the computer is enabled to perform a function implemented by a virtual forwarding device in the business service providing method in the embodiments.

The embodiments further provide a third computer program product including instructions. When the third computer program product is run on a computer, the computer is enabled to perform a function implemented by a remote acceleration gateway in the business service providing method in the embodiments.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

In the embodiments, the terms "first", "second", and "third" are merely used for a purpose of description and shall not be understood as an indication or implication of relative importance. Unless otherwise explicitly limited, the term "at least one" refers to one or more, and the term "a plurality of" refers to two or more.

The term "and/or" describes only an association relationship for describing associated objects and indicates that three relationships may exist. For example, A and/or B may indicate the following three cases: Only A exists, both A and B exist, and only B exists. In addition, the character "/" usually represents an "or" relationship between the associated objects.

The foregoing descriptions are merely optional embodiments, but are not intended as limiting. Any modification, equivalent replacement, or improvement made without departing from the concept and principle should fall within the scope of the embodiments.

What is claimed is:

1. A method comprising:
   receiving, by a remote acceleration gateway, a second service request packet sent by a client, wherein a source internet protocol (IP) address of the second service request packet is an IP address of the client and a destination IP address is an IP address of the remote acceleration gateway;
   performing, by the remote acceleration gateway, destination address translation on the second service request packet to generate a first service request packet, wherein a source IP address of the first service request packet is the IP address of the client, the destination IP address is a public IP address associated with a virtual machine, the virtual machine is configured to provide a business service for the client, and the destination address translation is based on a binding relationship between an acceleration IP address of the remote acceleration gateway and the public IP address associated with the virtual machine;
   encapsulating, by the remote acceleration gateway, the first service request packet to generate a first overlay packet, wherein the first overlay packet carries the IP address of the remote acceleration gateway; and
   sending, by the remote acceleration gateway, the first overlay packet to a border gateway on which the virtual machine is located.

2. The method according to claim 1, further comprising:
   receiving, by the remote acceleration gateway, a fourth overlay packet sent by the border gateway, wherein a first service response packet is encapsulated in the fourth overlay packet, the source IP address of the first service response packet is the public IP address associated with the virtual machine, and the destination IP address is the IP address of the client;
   decapsulating, by the remote acceleration gateway, the fourth overlay packet to obtain the first service response packet;
   translating, by the remote acceleration gateway, the source IP address of the first service response packet to generate a second service response packet, wherein the source IP address of the second service response packet is the IP address of the remote acceleration gateway, and the destination IP address is the IP address of the client; and
   sending, by the remote acceleration gateway, the second service response packet to the client.

3. The method of claim 1, wherein, before and after the destination address translation, a source port of the first service request packet does not change compared with the source port of the second service request packet.

4. The method of claim 1, wherein the acceleration IP address is bound to public IP addresses associated with a plurality of virtual machines.

5. The method of claim 1, wherein the first service request packet is encapsulated by using second tunnel information.

6. The method of claim 5, wherein the second tunnel information includes an IP address of the border gateway, an IP address of a virtual forwarding device, and an identifier of a tunnel used by the border gateway and the virtual forwarding device.

7. A remote acceleration gateway comprising a network interface, a memory, and a processor, wherein the memory stores a program instruction, and the processor runs the program instruction to:
receive a second service request packet sent by a client, wherein a source internet protocol (IP) address of the second service request packet is an IP address of the client, and a destination IP address is an IP address of the remote acceleration gateway;
perform destination address translation on the second service request packet to generate a first service request packet, wherein a source IP address of the first service request packet is the IP address of the client, the destination IP address is a public IP address associated with a virtual machine, the virtual machine is configured to provide a business service for the client, and the destination address translation is based on a binding relationship between an acceleration IP address of the remote acceleration gateway and the public IP address associated with the virtual machine;
encapsulate the first service request packet to generate a first overlay packet, wherein the first overlay packet carries the IP address of the remote acceleration gateway; and
send the first overlay packet to a border gateway on which the virtual machine is located.

8. The remote acceleration gateway according to claim 7, wherein the processor further runs the program instruction to:
receive a fourth overlay packet sent by the border gateway, wherein a first service response packet is encapsulated in the fourth overlay packet, the source IP address of the first service response packet is the public IP address associated with the virtual machine, and the destination IP address is the IP address of the client;
decapsulate the fourth overlay packet to obtain the first service response packet;
perform source IP address translation on the first service response packet to generate a second service response packet, wherein the source IP address of the second service response packet is the IP address of the remote acceleration gateway, and the destination IP address is the IP address of the client; and
the remote acceleration gateway is further configured to send the second service response packet to the client.

9. The remote acceleration gateway of claim 7, wherein, before and after the destination address translation, a source port of the first service request packet does not change compared with the source port of the second service request packet.

10. The remote acceleration gateway of claim 7, wherein the acceleration IP address is bound to public IP addresses associated with a plurality of virtual machines.

11. The remote acceleration gateway of claim 7, wherein the first service request packet is encapsulated by using second tunnel information.

12. The remote acceleration gateway of claim 11, wherein the second tunnel information includes an IP address of the border gateway, an IP address of a virtual forwarding device, and an identifier of a tunnel used by the border gateway and the virtual forwarding device.

* * * * *